US012783269B2

(12) United States Patent
Hadar et al.

(10) Patent No.: US 12,783,269 B2
(45) Date of Patent: Nov. 3, 2026

(54) DISTRIBUTED DATA NODES FOR FLEXIBLE DATA MESH ARCHITECTURES

(71) Applicant: Accenture Global Solutions Limited, Dublin (IE)

(72) Inventors: Eitan Hadar, Nesher (IL); Dan Klein, Rosh Ha'ayin (IL); Lisa O'Connor, Burtonsville, MD (US)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 1011 days.

(21) Appl. No.: 17/898,153

(22) Filed: Aug. 29, 2022

(65) Prior Publication Data

US 2023/0067777 A1 Mar. 2, 2023

Related U.S. Application Data

(60) Provisional application No. 63/238,895, filed on Aug. 31, 2021.

(51) Int. Cl.
*G06F 9/455* (2018.01)
*G06F 9/445* (2018.01)

(52) U.S. Cl.
CPC .......... *G06F 9/455* (2013.01); *G06F 9/44505* (2013.01)

(58) Field of Classification Search
CPC ................. G06F 9/455; G06F 9/44505; H04L 41/0816; H04L 41/0853; H04L 41/0866;
(Continued)

(56) References Cited

U.S. PATENT DOCUMENTS 5,521,910 A 5/1996 Matthews
6,279,113 B1 8/2001 Vaidya
(Continued)

FOREIGN PATENT DOCUMENTS

EP 1559008 8/2005
EP 1768043 3/2007
(Continued)

OTHER PUBLICATIONS

Vaquero et al. "Deploying Large-Scale Datasets on-Demand in the Cloud: Treats and Tricks on Data Distribution" IEEE Transactions on Cloud Computing, vol. 3, No. 2, Apr./Jun. 2015 [retrieved on Sep. 30, 2025] (Year: 2015).*
(Continued)

*Primary Examiner* — Emerson C Puente
*Assistant Examiner* — Alfred H B Wechselberger
(74) *Attorney, Agent, or Firm* — Mannava & Kang, P.C.

(57) ABSTRACT

Implementations include distributed data nodes for flexible data mesh architectures. A method includes obtaining first configuration data for a data mesh including a plurality of data nodes, wherein each data node of the plurality of data nodes is configured to receive instructions and perform operations based on the instructions, the operations including processing input data and producing output data; simulating operations of the data mesh to generate simulation results using the first configuration data; determining, based on the simulation results, that the first configuration data satisfies criteria for configuring the data mesh; generating, from the first configuration data and based on the simulation results, a set of instructions for the plurality of data nodes of the data mesh; and configuring the data mesh based on the first configuration data by deploying the set of instructions to the plurality of data nodes of the data mesh.

18 Claims, 11 Drawing Sheets

(58) Field of Classification Search
CPC ............. H04L 41/0806; H04L 41/0894; H04L 41/147; H04L 41/22; H04L 41/12; H04L 41/16; H04L 41/145; H04L 41/149; H04L 41/0893; H04L 41/122; H04L 41/34; H04L 41/342; H04L 41/344; H04L 41/40; H04W 84/18
See application file for complete search history.

(56) References Cited

U.S. PATENT DOCUMENTS

| | | | |
|---|---|---|---|
| 6,487,666 | B1 | 11/2002 | Shanklin et al. |
| 7,540,025 | B2 | 5/2009 | Tzadikario |
| 7,703,138 | B2 | 4/2010 | Desai et al. |
| 7,904,962 | B1 | 3/2011 | Jajodia et al. |
| 8,099,760 | B2 | 1/2012 | Cohen et al. |
| 8,176,561 | B1 | 5/2012 | Hurst et al. |
| 8,656,493 | B2 | 2/2014 | Capalik |
| 8,881,288 | B1 | 11/2014 | Levy et al. |
| 9,256,739 | B1 | 2/2016 | Roundy et al. |
| 9,563,771 | B2 | 2/2017 | Lang et al. |
| 9,633,306 | B2 | 4/2017 | Liu et al. |
| 10,084,804 | B2 | 9/2018 | Kapadia et al. |
| 10,291,645 | B1 | 5/2019 | Frantzen et al. |
| 10,382,473 | B1 | 8/2019 | Ashkenazy et al. |
| 10,447,721 | B2 | 10/2019 | Lasser |
| 10,447,727 | B1 | 10/2019 | Hecht |
| 10,601,854 | B2 | 3/2020 | Lokamathe et al. |
| 10,642,840 | B1 | 5/2020 | Attaluri et al. |
| 10,659,488 | B1 | 5/2020 | Rajasooriya et al. |
| 10,771,492 | B2 | 9/2020 | Hudis et al. |
| 10,848,515 | B1 | 11/2020 | Pokhrel et al. |
| 10,868,825 | B1 | 12/2020 | Dominessy et al. |
| 10,873,533 | B1 | 12/2020 | Ismailsheriff et al. |
| 10,956,566 | B2 | 3/2021 | Shu et al. |
| 10,958,667 | B1 | 3/2021 | Maida et al. |
| 11,089,040 | B2 | 8/2021 | Jang et al. |
| 11,128,654 | B1 | 9/2021 | Joyce et al. |
| 11,159,555 | B2 | 10/2021 | Hadar et al. |
| 11,184,385 | B2 | 11/2021 | Hadar et al. |
| 11,232,235 | B2 | 1/2022 | Hadar et al. |
| 11,277,431 | B2 | 3/2022 | Hassanzadeh et al. |
| 11,281,806 | B2 | 3/2022 | Hadar et al. |
| 11,283,824 | B1 | 3/2022 | Berger et al. |
| 11,283,825 | B2 | 3/2022 | Grabois et al. |
| 11,411,976 | B2 | 8/2022 | Basovskiy et al. |
| 11,463,322 | B1 * | 10/2022 | Sha ........................ H04L 41/122 |
| 11,483,213 | B2 | 10/2022 | Engelberg et al. |
| 11,533,332 | B2 | 12/2022 | Engelberg et al. |
| 2005/0138413 | A1 | 6/2005 | Lippmann et al. |
| 2005/0193430 | A1 | 9/2005 | Cohen et al. |
| 2006/0037077 | A1 | 2/2006 | Gadde et al. |
| 2008/0044018 | A1 | 2/2008 | Scrimsher et al. |
| 2008/0289039 | A1 | 11/2008 | Rits et al. |
| 2008/0301765 | A1 | 12/2008 | Nicol et al. |
| 2009/0077666 | A1 | 3/2009 | Chen et al. |
| 2009/0138590 | A1 | 5/2009 | Lee et al. |
| 2009/0307772 | A1 | 12/2009 | Markham et al. |
| 2009/0319248 | A1 | 12/2009 | White et al. |
| 2010/0058456 | A1 | 3/2010 | Jajodia et al. |
| 2010/0138925 | A1 | 6/2010 | Barai et al. |
| 2010/0174670 | A1 | 7/2010 | Malik et al. |
| 2011/0035803 | A1 | 2/2011 | Lucangeli Obes et al. |
| 2011/0061104 | A1 | 3/2011 | Sarraute Yamada et al. |
| 2011/0093916 | A1 | 4/2011 | Lang et al. |
| 2011/0093956 | A1 | 4/2011 | Laarakkers et al. |
| 2013/0097125 | A1 | 4/2013 | Marvasti et al. |
| 2013/0219503 | A1 | 8/2013 | Amnon et al. |
| 2014/0082738 | A1 | 3/2014 | Bahl |
| 2014/0173740 | A1 | 6/2014 | Albanese et al. |
| 2015/0047026 | A1 | 2/2015 | Neil et al. |
| 2015/0106867 | A1 | 4/2015 | Liang |
| 2015/0199207 | A1 | 7/2015 | Lin et al. |
| 2015/0261958 | A1 | 9/2015 | Hale et al. |
| 2015/0326601 | A1 | 11/2015 | Grondin et al. |
| 2015/0350018 | A1 | 12/2015 | Hui et al. |
| 2016/0105454 | A1 | 4/2016 | Li et al. |
| 2016/0205122 | A1 | 7/2016 | Bassett |
| 2016/0239330 | A1 * | 8/2016 | Mc Bride ........... G06F 9/44505 |
| 2016/0277423 | A1 | 9/2016 | Apostolescu et al. |
| 2016/0292599 | A1 | 10/2016 | Andrews et al. |
| 2016/0301704 | A1 | 10/2016 | Hassanzadeh et al. |
| 2016/0301709 | A1 | 10/2016 | Hassanzadeh et al. |
| 2017/0012836 | A1 | 1/2017 | Tongaonkar et al. |
| 2017/0032130 | A1 | 2/2017 | Joseph et al. |
| 2017/0041334 | A1 | 2/2017 | Kahn et al. |
| 2017/0078322 | A1 | 3/2017 | Seiver et al. |
| 2017/0085595 | A1 | 3/2017 | Ng et al. |
| 2017/0163506 | A1 | 6/2017 | Keller |
| 2017/0230410 | A1 | 8/2017 | Hassanzadeh et al. |
| 2017/0318050 | A1 | 11/2017 | Hassanzadeh et al. |
| 2017/0324768 | A1 | 11/2017 | Crabtree et al. |
| 2017/0364702 | A1 | 12/2017 | Goldfarb et al. |
| 2017/0366416 | A1 | 12/2017 | Beecham et al. |
| 2018/0013771 | A1 | 1/2018 | Crabtree et al. |
| 2018/0103052 | A1 | 4/2018 | Choudhury et al. |
| 2018/0152468 | A1 | 5/2018 | Nor et al. |
| 2018/0159890 | A1 | 6/2018 | Warnick et al. |
| 2018/0183827 | A1 | 6/2018 | Zorlular et al. |
| 2018/0255077 | A1 | 9/2018 | Paine |
| 2018/0255080 | A1 | 9/2018 | Paine |
| 2018/0295154 | A1 | 10/2018 | Crabtree et al. |
| 2018/0324609 | A1 * | 11/2018 | Diancin ................ H04W 84/18 |
| 2018/0367548 | A1 | 12/2018 | Stokes, III et al. |
| 2019/0052663 | A1 | 2/2019 | Lee et al. |
| 2019/0052664 | A1 | 2/2019 | Kibler et al. |
| 2019/0132344 | A1 | 5/2019 | Lem et al. |
| 2019/0141058 | A1 | 5/2019 | Hassanzadeh et al. |
| 2019/0182119 | A1 | 6/2019 | Ratkovic et al. |
| 2019/0188389 | A1 | 6/2019 | Peled et al. |
| 2019/0230129 | A1 | 7/2019 | Digiambattista et al. |
| 2019/0312898 | A1 | 10/2019 | Verma et al. |
| 2019/0319987 | A1 | 10/2019 | Levy et al. |
| 2019/0362279 | A1 | 11/2019 | Douglas |
| 2019/0373005 | A1 | 12/2019 | Bassett |
| 2020/0014718 | A1 | 1/2020 | Joseph Durairaj et al. |
| 2020/0042328 | A1 | 2/2020 | Gupta |
| 2020/0042712 | A1 | 2/2020 | Foo et al. |
| 2020/0045069 | A1 | 2/2020 | Nanda et al. |
| 2020/0099704 | A1 | 3/2020 | Lee et al. |
| 2020/0112487 | A1 | 4/2020 | Inamdar et al. |
| 2020/0128047 | A1 | 4/2020 | Biswas et al. |
| 2020/0137104 | A1 | 4/2020 | Hassanzadeh et al. |
| 2020/0175175 | A1 | 6/2020 | Hadar et al. |
| 2020/0177615 | A1 | 6/2020 | Grabois et al. |
| 2020/0177616 | A1 | 6/2020 | Hadar et al. |
| 2020/0177617 | A1 | 6/2020 | Hadar et al. |
| 2020/0177618 | A1 | 6/2020 | Hassanzadeh et al. |
| 2020/0177619 | A1 | 6/2020 | Hadar et al. |
| 2020/0272972 | A1 | 8/2020 | Harry et al. |
| 2020/0296137 | A1 | 9/2020 | Crabtree et al. |
| 2020/0311630 | A1 | 10/2020 | Risoldi et al. |
| 2020/0351295 | A1 | 11/2020 | Nhlabatsi et al. |
| 2020/0358804 | A1 | 11/2020 | Crabtree et al. |
| 2021/0006582 | A1 | 1/2021 | Yamada et al. |
| 2021/0014265 | A1 | 1/2021 | Hadar et al. |
| 2021/0099490 | A1 | 4/2021 | Crabtree et al. |
| 2021/0105185 | A1 * | 4/2021 | Parekh .................... H04L 41/40 |
| 2021/0105294 | A1 | 4/2021 | Kruse et al. |
| 2021/0116903 | A1 * | 4/2021 | Bouzon ................ G05B 19/048 |
| 2021/0168175 | A1 | 6/2021 | Crabtree et al. |
| 2021/0173711 | A1 | 6/2021 | Crabtree et al. |
| 2021/0218770 | A1 | 7/2021 | Ben-Yosef et al. |
| 2021/0226849 | A1 * | 7/2021 | Malhotra ............ H04L 41/0894 |
| 2021/0248443 | A1 | 8/2021 | Shu et al. |
| 2021/0273978 | A1 | 9/2021 | Hadar et al. |
| 2021/0288995 | A1 | 9/2021 | Attar et al. |
| 2021/0336981 | A1 | 10/2021 | Akella et al. |
| 2021/0409426 | A1 | 12/2021 | Engelberg et al. |
| 2021/0409439 | A1 | 12/2021 | Engelberg et al. |
| 2022/0014445 | A1 | 1/2022 | Engelberg et al. |
| 2022/0014534 | A1 | 1/2022 | Basovskiy et al. |
| 2022/0021698 | A1 | 1/2022 | Hadar et al. |
| 2022/0038491 | A1 | 2/2022 | Hadar et al. |
| 2022/0051111 | A1 | 2/2022 | Hadar et al. |

(56) References Cited

U.S. PATENT DOCUMENTS

| | | | |
|---|---|---|---|
| 2022/0070202 | A1 | 3/2022 | Busany et al. |
| 2022/0124115 | A1 | 4/2022 | Grabois et al. |
| 2022/0129590 | A1 | 4/2022 | Hadar et al. |
| 2022/0131894 | A1 | 4/2022 | Hassanzadeh et al. |
| 2022/0150270 | A1 | 5/2022 | Klein et al. |
| 2022/0182406 | A1 | 6/2022 | Inokuchi |
| 2022/0188460 | A1 | 6/2022 | Hadar et al. |
| 2022/0263855 | A1 | 8/2022 | Engelberg et al. |
| 2022/0337617 | A1 | 10/2022 | Basovskiy et al. |
| 2023/0021961 | A1 | 1/2023 | Engelberg et al. |
| 2023/0034910 | A1 | 2/2023 | Engelberg et al. |
| 2023/0067128 | A1 | 3/2023 | Engelberg et al. |
| 2023/0076372 | A1 | 3/2023 | Engelberg et al. |

FOREIGN PATENT DOCUMENTS

| | | |
|---|---|---|
| EP | 2385676 | 11/2011 |
| EP | 2816773 | 12/2014 |
| EP | 3644579 | 4/2020 |
| EP | 3664411 | 6/2020 |
| WO | WO 2018/002484 | 1/2018 |
| WO | WO 2020/242275 | 12/2020 |

OTHER PUBLICATIONS

"Network Topology" [Website] Retrieved from <<https://www.geeksforgeeks.org/computer-networks/network-topology/>>. Retrieved on [Jan. 5, 2026] (Year: 2025).*

Preethiya et al. "Providing Secured Data Aggregation in Mobile Wireless Sensor Network" 2018 IEEE 4th International Symposium in Robotics and Manufacturing Automation (ROMA) [retrieved on Jun. 25, 2026] (Year: 2018).*

Aschenbruck et al. "An integrated simulation environment for sensor data fusion applications in wireless mesh networks" he 2011 Military Communications Conference—Track 5—Communications and Network System [retrieved on Jun. 25, 2026] (Year: 2011).*

Chen Zhong, Towards Agile Cyber Analysis: Leveraging Visualization as Functions in Collaborative Visual Analytics, IEEE:2017, pp. 1-2.

EP Extended Search Report in European Appln. No. 22187514.9, dated Nov. 29, 2022, 7 pages.

EP Extended Search Report in European Appln. No. 22193272.6, dated Jan. 25, 2023, 8 pages.

3ds.com [online], "New Customer Experience," available on or before Aug. 7, 2020 via Internet Archive: Wayback Machine URL<https://web.archive.org/web/20200807204455/https://ifwe.3ds.com/transportation-mobility/new-customer-experience>, retrieved on Jul. 9, 2021, retrieved from URL<https://ifwe.3ds.com/transportation-mobility/new-customer-experience>, 9 pages.

Abraham et al. "A Predictive Framework for Cyber Security Analytics Using Attack Graphs." International Journal of Computer Networks & Communications (IJCNC). vol. 7, No. 1, Jan. 2015. (Year: 2015).

Abraham et al., "Cyber Security Analytics: A Stochastic Model for Security Quantification Using Absorbing Markov Chains," Journal of Communications, Dec. 2014, 9(12):899-907.

Almeida et al., "An ontological analysis of the notion of community in the RM-ODP enterprise language," Computer Standards & Interfaces, Mar. 2013, 35(3):257-268.

Alvarenga et al., "Discovering Attack Strategies Using Process Mining," Presented at Proceedings of The Eleventh Advanced International Conference on Telecommunications, Brussels, Belgium, Jun. 21-26, 2015, 119-125.

Amar et al., "Using finite-state models for log differencing," Proceedings of the 2018 26th ACM Joint Meeting on European Software Engineering Conference and Symposium on the Foundations of Software Engineering (ESEC/FSE 2018), Lake Buena Vista, Florida, Nov. 4-9, 2018, 49-59.

Annane et al., "BBO: BPMN 2.0 based ontology for business process representation," Presented at Proceedings of the 20th European Conference on Knowledge Management (ECKM 2019), Lisbonne, Portugal, Sep. 5-6, 2019, 49-59.

Ashton et al., "That 'internet of things' thing, " RFID Journal, Jun. 22, 2009, 1 page.

Atoum et al., "A holistic cyber security implementation framework," Information Management & Computer Security, Jul. 2014, 22(3):251-264.

Barik et al., "Attack Graph Generation and Analysis Techniques," Defence Science Journal, Nov. 2016, 66(6):559-567.

Barrère et al., "Naggen: a Network Attack Graph GENeration Tool—IEE CNS 17 Poster," 2017 IEEE Conference on Communications and Network Security, Oct. 2017, Las Vegas, NV, USA, 378-379.

Bonacich, "Power and Centrality: A Family of Measures," American Journal of Sociology, Mar. 1987, 92(5):1170-1182.

Borgatti et al., "A Graph-theoretic perspective on centrality," Social Networks, Oct. 2006, 28(4):466-484.

Borgo et al., "Ontological Foundations of DOLCE," Theory and Applications of Ontology: Computer Applications, Aug. 5, 2010, 279-295.

Brazhuk, "Towards automation of threat modeling based on a semantic model of attack patterns and weaknesses," arXiv, Dec. 8, 2021, arXiv:2112.04231v1, 14 pages.

Burger et al., "Scaling to the end of silicon with edge architectures," Computer, Jul. 2004, 37(7):44-55.

Challenge.org [online], "Incorporating digital twin into internet cyber security - creating a safer future," May 2018, retrieved on Jul. 9, 2021, retrieved from URL<https://www.challenge.org/insights/digital-twin-cyber-security/>, 10 pages.

Chen et al., "Distributed Attack Modeling Approach Based on Process Mining and Graph Segmentation," Entropy, Sep. 2020, 22(9):1026, 21 pages.

Cohen-Addad et al., "Hierarchical Clustering: Objective Functions and Algorithms," Journal of the ACM, Jun. 2019, 66(4):26, 42 pages.

Coltellese et al., "Triage of IoT Attacks Through Process Mining," Presented at Proceedings of On the Move to Meaningful Internet Systems Conference 2019, Rhodes, Greece, Oct. 21-25, 2019; Lecture Notes in Computer Science, Oct. 2019, 11877:326-344.

Cravero, "Big data architectures and the internet of things: A systematic mapping study," IEEE Latin America Transactions, Apr. 2018, 16(4):1219-1226.

CyberSecurity Works.com [online], "MITRE Mapping of CISA KEVs and its Challenges," Jun. 29, 2022, retrieved on Oct. 4, 2022, retrieved from URL<https://cybersecurityworks.com/blog/cisa/mitre-mapping-of-cisa-kevs-and-its-challenges.html>, 6 pages.

Cycognito.com [online], "Identifying and Managing Vulnerabilities on All Your Attacker-Exposed Assets, All the Time: Benefits of the CyCognito Platform for Vulnerability Management," available on or before Oct. 22, 2020 via Internet Archive: Wayback Machine URL<https://web.archive.org/web/20201022120625/https://www.cycognito.com/vulnerability-management>, retrieved on Oct. 4, 2022, retrieved from URL<https://www.cycognito.com/vulnerability-management>, 15 pages.

Daniele et al., "An ontological approach to logistics," Enterprise Interoperability: Research and Applications in the Service-oriented Ecosystem, Oct. 11, 2013, 199-213.

Das et al., "V2W-BERT: A Framework for Effective Hierarchical Multiclass Classification of Software Vulnerabilities," CoRR, submitted on Feb. 23, 2021, arXiv:2102.11498v1, 11 pages.

Degen et al., "Gol: toward an axiomatized upper-level ontology," Presented at Proceedings of the International Conference on Formal Ontology in Information Systems, Ogunquit, Maine, USA, Oct. 17-19, 2001, 34-46.

Duarte et al., "Towards an Ontology of Requirements at Runtime," Formal Ontology in Information Systems, Jan. 2016, 283:255-268.

El Saddik, "Digital Twins: The Convergence of Multimedia Technologies," IEEE MultiMedia, Apr.-Jun. 2018, 25(2):87-92.

EP Extended Search Report in European Appln. No. 21191752.1, dated Jan. 4, 2022, 8 pages.

EP Extended Search Report in European Appln. No. 22157487.4, dated Jun. 9, 2022, 10 pages.

(56) References Cited

OTHER PUBLICATIONS

EP Search Report in European Application No. EP 19212981, dated Mar. 4, 2020, 6 pages.
EP Search Report in European Application No. EP13290145, dated Nov. 12, 2013, 2 pages.
EP Search Report in European Application No. EP19212974, dated Feb. 14, 2020, 8 pages.
EP Search Report in European Application No. EP19212976, dated Feb. 14, 2020, 8 pages.
EP Search Report in European Application. No. 21159421.3, dated Jun. 30, 2021, 11 pages.
EP Search Report in European Application. No. EP20185251, dated Oct. 21, 2020, 7 pages.
Fielder et al., "Decision support approaches for cyber security investment," Decision Support Systems, Jun. 2016, 86:13-23.
Foundations of Databases, 1st ed., Abiteboul et al. (eds.), 1995, Chapter 12, 38 pages.
Fundamentals of Business Process Management, 2nd ed., Dumas et al. (eds.), 2018, 546 pages.
Gailly et al., "Ontological Reengineering of the REA-EO using UFO," Presented at Proceedings of the International Workshop on Ontology-Driven Software Engineering, Orlando, FL, USA, Oct. 2009, 15 pages.
Gandomi et al., "Beyond the hype: Big data concepts, methods, and analytics," International Journal of Information Management, Apr. 2015, 35(2):137-144.
GE.com [online], "Predix Platform," available on or before Nov. 16, 2018 via Internet Archive: Wayback Machine URL<https://web.archive.org/web/20181116005032/https://www.ge.com/digital/iiot-platform>, retrieved on Jul. 9, 2021, retrieved from URL<https://www.ge.com/digital/iiot-platform>, 6 pages.
Genovese, "Data mesh: the newest paradigm shift for a distributed architecture in the data world and its application," Thesis for the degree of Computer Engineering, Politecnico di Torino, 2021, 76 pages.
Gergeleit et al., "Modeling Security Requirements and Controls for an Automated Deployment of Industrial IT Systems," Kommunikation und Bildverarbeitung in der Automation. Technologien für die intelligente Automation (Technologies for Intelligent Automation), Jan. 14, 2020, 12:217-231.
GitHub.com [online], "ALFA-group/BRON," available on or before Nov. 23, 2021 via Internet Archive: Wayback Machine URL<https://web.archive.org/web/20211123023700/https://github.com/ALFA-group/BRON>, retrieved on Oct. 4, 2022, retrieved from URL<https://github.com/ALFA-group/BRON>, 5 pages.
Giunchiglia et al., "Lightweight Ontologies," Technical Report DIT-07-071, University of Trento, Oct. 2007, 10 pages.
Gomez-Perez et al., "Ontology languages for the Semantic Web," IEEE Intelligent Systems, Feb. 2002, 17(1):54-60.
Grieves, "Virtually Intelligent Product Systems: Digital and Physical Twins", Complex Systems Engineering: Theory and Practice, Jul. 2019, 256:175-200.
Grigorescu et al., "CVE2ATT&CK: BERT-Based Mapping of CVEs to Mitre ATT&CK Techniques," Algorithms, Aug. 31, 2022, 15(9):314, 22 pages.
Guarino, "Formal Ontology in Information Systems," Presented at Proceedings of the 1 st International Conference, Trento, Italy, Jun. 6-8, 1998, 3-15.
Guizzardi et al., "An Ontology-Based Approach for Evaluating the Domain Appropriateness and Comprehensibility Appropriateness of Modeling Languages," MoDELS, 2005, 691-705.
Guizzardi, "On Ontology, ontologies, Conceptualizations, Modeling Languages, and (Meta)Models," Presented at Proceedings of the 2007 conference on Databases and Information Systems IV: Selected Papers from the Seventh International Baltic Conference, Amsterdam, Netherlands, Jun. 5, 2007, 18 pages.
Guizzardi, "Ontological Foundations for Structural Conceptual Models," Thesis for the degree of Doctor, University of Twente, 2005, 441 pages.
Guizzardi, "Ontology, Ontologies and the "I" of FAIR," Data Intelligence, Jan. 1, 2020, 2(1-2):181-191.
Guizzardi, "The role of foundational ontology for conceptual modeling and domain ontology representation," Presented at Proceedings of the 7th International Baltic Conference on Databases and Information Systems, Vilnius, Lithuania, Jul. 3-6, 2006, 9 pages.
Hadar et al., "Big Data Analytics on Cyber Attack Graphs for Prioritizing Agile Security Requirements", Proceedings of the 2019 IEEE 27th International Requirements Engineering Conference, Sep. 23-27, 2019, Jeju Island, Kora, 330-339.
Hadar et al., "Cyber Digital Twin Simulator for Automatic Gathering and Prioritization of Security Controls Requirements," Proceedings of the 2020 IEEE 28th International Requirements Engineering Conference, Aug. 31-Sep. 4, 2020, Zurich, Switzerland, 250-259.
Hansen et al., "Model-in-the-Loop and Software-in-the-Loop Testing of Closed-Loop Automotive Software with Arttest," Informatik, 2017, 13 pages.
Hasan et al., "Towards Optimal Cyber Defense Remediation in Energy Delivery Systems", Proceedings of 2019 IEEE Global Communications Conference, Dec. 9-13, 2019, Waikoloa, Hawaii, 7 pages.
Hassani et al., "Artificial Intelligence (AI) or Intelligence Augmentation (IA): What Is the Future?," AI, Apr. 12, 2020, 1(2):143-155.
Hemberg et al., "BRON—Linking Attack Tactics, Techniques, and Patterns with Defensive Weaknesses, Vulnerabilities and Affected Platform Configurations," arXiv, Oct. 1, 2020, arXiv:2010.00533v1, 14 pages.
Hemberg et al., "Using a Collated Cybersecurity Dataset for Machine Learning and Artificial Intelligence," arXiv, Aug. 5, 2021, arXiv:2108.02618v1, 5 pages.
Herre, "General Formal Ontology (Gfo): A Foundational Ontology for Conceptual Modelling," Theory and Applications of Ontology: Computer Applications, Aug. 12, 2010, 297-345.
Hofner et al., "Dijkstra, Floyd and Warshall meet Kleene," Formal Aspects of Computing, Jul. 2012, 24(4-6):459-476.
Horrocks et al., "Swrl: A Semantic Web Rule Language Combining OWL and RuleML," W3C Member Submission, May 21, 2004, 24 pages.
Husák et al., "Survey of Attack Projection, Prediction, and Forecasting in Cyber Security," IEEE Communications Surveys & Tutorials, Sep. 24, 2018, 21(1):640-660.
Idika et al., "Extending attack graph-based security metrics and aggregating their application," IEEE Transactions on Dependable and Secure Computing, January/Feb. 2012, 9(1):75-85.
IEEE, "IEEE Standard for extensible Event Stream (XES) for Achieving Interoperability in Event Logs and Event Stream," IEEE Std 1849™—2016, Sep. 22, 2016, 50 pages.
IEEE.org [online], "This Car Runs on Code," Feb. 1, 2009, retrieved on Jul. 9, 2021, retrieved from URL<https://spectrum.ieee.org/transportation/systems/this-car-runs-on-code>, 5 pages.
Ingols et al., "Practical Attack Graph Generation for Network Defense," 2006 22nd Annual Computer Security Applications Conference (ACSAC'06), Miami Beach, Florida, Dec. 11-15, 2006, 10 pages.
International Organization for Standardization, "International Standard: ISO/IEC 27001," ISO/IEC 27001:2013(E), Oct. 1, 2013, 29 pages.
Jacobsen et al., "FAIR Principles: Interpretations and Implementation Considerations," Data Intelligence, Jan. 1, 2020, 2(1-2):10-29.
Joint Task Force Transformation Initiative, "Security and Privacy Controls for Federal Information Systems and Organizations," National Institute of Standards and Technology Special Publication 800-53, Revision 4, Jan. 22, 2015, 462 pages.
Kaloroumakis et al., "Toward a Knowledge Graph of Cybersecurity Countermeasures," Technical Report, The MITRE Corporation, 2021, 11 pages.
Khouzani et al., "Scalable min-max multi-objective cyber-security optimization over probabilistic attack graphs", European Journal of Operational Research, Nov. 1, 2019, 278(3):894-903.
Li et al., "Cluster security research involving the modeling of network exploitations using exploitation graphs," Proceedings of

(56) References Cited

OTHER PUBLICATIONS the IEEE International Symposium on Cluster Computing and the Grid, Singapore, May 16-19, 2006, 11 pages.

Lippmann et al., "Validating and restoring defense in depth using attack graphs," Proceedings of the Military Communications Conference, Washington, DC, USA, Oct. 23-25, 2006, 10 pages.

Lu et al., "Ranking attack graphs with graph neural networks," Proceedings of the 5th International Conference on Information Security Practice and Experience, Xi'an, China, Apr. 13-15, 2009; Lecture Notes in Computer Science, Apr. 2009, 5451:345-359.

Machado et al., "Data Mesh: Concepts and Principles of a Paradigm Shift in Data Architectures," Procedia Computer Science, 2022, 196:263-271.

Machado et al., "Data-Driven Information Systems: The Data Mesh Paradigm Shift," Presented at Proceedings of the 29th International Conference on Information Systems Development, Valencia, Spain, Sep. 8-10, 2021, 6 pages.

Makridakis, "The forthcoming artificial intelligence (ai) revolution: Its impact on society and firms," Futures, Jun. 2017, 90:46-60.

Manning Free Content Center [online], "Building Your Vocabulary," dated May 19, 2017, retrieved on Jun. 3, 2020, retrieved from URL <https://freecontent.manning.com/building-your-vocabulary/>, 10 pages.

Martins et al., "A framework for conceptual characterization of ontologies and its application in the cybersecurity domain," Software and Systems Modeling, Jul. 2, 2022, 21:1437-1464.

Martins et al., "Conceptual Characterization of Cybersecurity Ontologies," The Practice of Enterprise Modelling, Nov. 18, 2020, 323-338.

MaschinenMarkt.international [online], "Digital twin in the automobile industry," Aug. 1, 2019, retrieved on Jul. 9, 2021, retrieved from URL<https://www.maschinenmarkt.international/digital-twin-in-the-automobile-industry-a-851549/>, 3 pages.

Mashable.com [online], "Ford ready to innovate, but not at the expense of customer needs," May 31, 2016, retrieved on Jul. 9, 2021, retrieved from URL<https://mashable.com/article/mark-fields-ford-codecon>, 7 pages.

Mathis, "Data lakes," Datenbank-Spektrum, Oct. 6, 2017, 17(3):289-293.

Mehta et al., "Ranking attack graphs," Proceedings of the International Conference on Recent Advances in Intrusion Detection, Hamburg, Germany, Sep. 20-22, 2006; Lecture Notes in Computer Science, Sep. 2006, 4219:127-144.

Mitre.org [online], "CAPEC: Common Attack Pattern Enumerations and Classifications," available on or before Jul. 21, 2007 via Internet Archive: Wayback Machine URL<https://web.archive.org/web/20070721234158/https://capec.mitre.org/>, retrieved on Oct. 4, 2022, retrieved from URL<https://capec.mitre.org/>, 2 pages.

Mitre.org [online], "CWE: Common Weakness Enumeration," available on or before Oct. 9, 2006 via Internet Archive: Wayback Machine URL<https://web.archive.org/web/20061009060144/https://cwe.mitre.org/>, retrieved on Oct. 4, 2022, retrieved from URL<https://cwe.mitre.org/>, 1 page.

MITRE.org [online], "D3FEND," available on or before Jun. 22, 2021 via Internet Archive: Wayback Machine URL<https://web.archive.org/web/20210622142005/https://d3fend.mitre.org/>, retrieved on Jul. 13, 2022, retrieved from URL<https://d3fend.mitre.org/>, 3 pages.

MITRE.org [online], "Digital Artifact Ontology," available on or before Jun. 25, 2021 via Internet Archive: Wayback Machine URL<https://web.archive.org/web/20210625024718/https://d3fend.mitre.org/dao>, retrieved on Jul. 13, 2022, retrieved from URL<https://d3fend.mitre.org/dao/>, 3 pages.

MITRE.org [online], "Service Application," available on or before Jun. 25, 2021 via Internet Archive: Wayback Machine URL<https://web.archive.org/web/20210625024952/https://d3fend.mitre.org/dao/artifact/d3f:ServiceApplication/>, retrieved on Jul. 13, 2022, retrieved from URL<https://d3fend.mitre.org/dao/artifact/d3f:ServiceApplication/>, 1 page.

Monino, "Data Value, Big Data Analytics, and Decision-Making," Journal of the Knowledge Economy, Aug. 20, 2016, 256-267.

Murata, "Petri Nets: Properties, Analysis and Applications," Proceedings of the IEEE, Apr. 1989, 77(4):541-580.

Narmeen Zakaria Bawany; DDoS Attack Detection and Mitigation Using SON: Methods, Practices, and Solutions; Springer-2017; p. 425-441.

National Institute of Standards and Technology [online], "National Vulnerability Database," last updated Jun. 2, 2020, retrieved on Jun. 3, 2020, retrieved from URL<https://nvd.nist.gov/>, 4 pages.

Neo4j.com [online], "Random Walk," available on or before Aug. 6, 2020 via Internet Archive: Wayback Machine URL<https://web.archive.org/web/20200806193136/https://neo4j.com/docs/graph-data-science/current/alpha-algorithms/random-walk/>, retrieved on Jul. 28, 2021, retrieved from URL<https://neo4j.com/docs/graph-data-science/current/alpha-algorithms/random-walk/>, 7 pages.

Neo4j.com [online], "Topological link prediction," available on or before May 17, 2020, via Internet Archive: Wayback Machine URL<https://web.archive.org/web/20200517111258/https://neo4j.com/docs/graph-data-science/current/algorithms/linkprediction/>, retrieved on Jun. 14, 2022, retrieved from URL<https://neo4j.com/docs/graph-data-science/current/algorithms/linkprediction/>, 2 pages.

Neo4j.com [online], "Yen's K-Shortest Paths," available on or before Aug. 6, 2020 via Internet Archive: Wayback Machine URL<https://web.archive.org/web/20200806185626/https://neo4j.com/docs/graph-data-science/current/alpha-algorithms/yen-s-k-shortest-path/, retrieved on Jul. 28, 2021, retrieved from URL<https://web.archive.org/web/20200806185626/https://neo4j.com/docs/graph-data-science/current/alpha-algorithms/yen-s-k-shortest-path/>, 5 pages.

Networks: An Introduction, Newman (ed.), May 2010, 789 pages.

Noel et al., "CyGraph: Graph-Based Analytics and Visualization for Cybersecurity," Handbook of Statistics, Jan. 2016, 35:117-167.

Ortalo et al., "Experimenting with quantitative evaluation tools for monitoring operational security," IEEE Transactions on Software Engineering, Sep./Oct. 1999, 25(5):633-650.

Ou et al., "A Scalable Approach to Attack Graph Generation," Proceedings of the 13th ACM Conference on Computer and Communication Security, Oct. 2006, 336-345.

Ou et al., "MulVAL: A Logic-based Network Security Analyzer," 14th USENIX Security Symposium, Aug. 2005, Baltimore, MD, USA, 16 pages.

Phillips et al., "A graph-based system for network-vulnerability analysis," Proceedings of the 1998 Workshop on New Security Paradigms, Charlottesville, Virginia, Sep. 22-26, 1998, 71-79.

PM4Py.de [online], "DFG: Process Discovery using Directly-Follows Graphs," available on or before Mar. 7, 2019 via Internet Archive: Wayback Machine URL<https://web.archive.org/web/20190307062454/http://pm4py.pads.rwth-aachen.de/documentation/process-discovery/dfg/>, retrieved on Jul. 28, 2021, retrieved from URL<https://web.archive.org/web/20190307062454/http://pm4py.pads.rwth-aachen.de/documentation/process-discovery/dfg/>, 4 pages.

PM4Py.de [online], "Process Discovery," available on or before Jun. 26, 2020 via Internet Archive: Wayback Machine URL<https://web.archive.org/web/20200626094921/https://pm4py.fit.fraunhofer.de/documentation#discovery>, retrieved on Jul. 28, 2021, retrieved from URL<https://pm4py.fit.fraunhofer.de/documentation#discovery>, 5 pages.

Process Mining, 1st ed., van der Aalst, 2011, Chapters 5-6, 63 pages.

Purvine et al., "A Graph-Based Impact Metric for Mitigating Latheral Movement Cyber Attacks", Automated Descision Making for Active Cyber Defence, Oct. 2016, pp. 45-52.

Q. Liu et al., "Latte: Large-Scale Lateral Movement Detection," MILCOM 2018—2018 IEEE Military Communications Conference (MILCOM), 2018, pp. 1-6, doi: 10.1109/MILCOM.2018.8599748. (Year: 2018).

Rossi et al., "Knowledge Graph Embedding for Link Prediction: A Comparative Analysis," arXiv, Feb. 3, 2020, arXiv:2002.00819v1, 42 pages.

Sales et al., "Ontological anti-patterns in taxonomic structures," Presented at Proceedings of ONTOBRAS 2019: XII Seminar on Ontology Research in Brazil, Porto Alegre, Brazil, Sep. 2-5, 2019, 13 pages.

(56) References Cited

OTHER PUBLICATIONS

Schatz et al., “Economic valuation for information security investment: a systematic literature review,” Information Systems Frontiers, Apr. 18, 2016, 19:1205-1228.

Shandilya et al., “Use of Attack Graphs in Security Systems”, Hindawi Journal of Computer Networks and Communications, Oct. 20, 2014, 2014:818957, 14 pages.

Shi et al., “Normalized Cuts and Image Segmentation,” IEEE Transactions on Pattern Analysis and Machine Intelligence, Aug. 2000, 22(8):888-905.

Siemens.com [online], “From vehicle design to multi-physical simulations,” available on or before Jul. 26, 2019 via Internet Archive: Wayback Machine URL<https://web.archive.org/web/20190726044643/https://new.siemens.com/global/en/markets/automotive-manufacturing/digital-twin-product.html>, retrieved on Jul. 9, 2021, retrieved from URL<https://new.siemens.com/global/en/markets/automotive-manufacturing/digital-twin-product.html>, 11 pages.

Sitton-Candanedo et al., “A review of edge computing reference architectures and a new global edge proposal,” Future Generation Computer Systems, Oct. 2019, 99:278-294.

SMMT.co.uk [online], “Role of Digital Twin in Automotive Industry,” Dec. 17, 2018, retrieved on Jul. 9, 2021, retrieved from URL<https://www.smmt.co.uk/2018/12/role-of-digital-twin-in-automotive-industry/>, 9 pages.

Sourceforge.net [online], “XSB,” last updated Oct. 29, 2017, retrieved on Jun. 3, 2020, retrieved from URL <http://xsb.sourceforge.net/>, 2 pages.

Stanek et al., “Method of comparing graph differencing algorithms for software differencing,” 2008 IEEE International Conference on Electro/Information Technology, Ames, Iowa, May 18-20, 2008, 482-487.

Strom et al., “MITRE ATT&CKTM: Design and Philosophy”, The MITRE Corporation, Jul. 2018, 37 pages.

Swiler et al., “A graph-based network-vulnerability analysis system,” Sandia National Laboratories, 1997, Tech. Rep. SAND97-3010/1, 25 pages.

Tan et al., “Future internet: The Internet of Things,” Presented at Proceedings of the 2010 3rd International Conference on Advanced Computer Theory and Engineering (ICACTE), Chengdu, China, Aug. 20-22, 2010.

TechCrunch.com [online], “Tesla is rolling out its Navigate on Autopilot feature,” Oct. 27, 2018, retrieved on Jul. 9, 2021, retrieved from URL<https://techcrunch.com/2018/10/26/tesla-is-rolling-out-its-navigate-on-autopilot-feature/>, 17 pages.

The Fourth Industrial Revolution, 1st. ed., Schwab, Jan. 2017, 218 pages.

The MITRE Corporation [online], “MITRE ATT&CK,” last updated May 27, 2020, retrieved on Jun. 3, 2020, retrieved from URL <https://attack.mitre.org/>, 3 pages.

Ullah et al., “Towards Modeling Attacker’s Opportunity for Improving Cyber Resilience in Energy Delivery Systems”, Resilience Week, Aug. 2018, pp. 100-107.

Uschold et al., “Ontologies: Principles, methods and applications,” The Knowledge Engineering Review, Jan. 1996, 11(2):93-136.

Van Der Aalst et al., “Causal Nets: A Modeling Language Tailored towards Process Discovery,” Presented at Proceedings of Concur 2011—Concurrency Theory, Aachen, Germany, Sep. 6-9, 2011; Lecture Notes in Computer Science, Sep. 2011, 6901:28-42.

Van Heijst et al., “Using explicit ontologies in KBS development,” International Journal of Human-Computer Studies, Feb. 1997, 46(2-3):183-292.

Vehicle Power Management, 1st ed., Zhang et al.(eds.), Aug. 2011, Chapter 10, 27 pages.

W3.org [online], “SWRL: A Semantic Web Rule Language Combining OWL and RuleML,” May 21, 2004, retrieved on Oct. 4, 2022, retrieved from URL<https://www.w3.org/Submission/SWRL/>, 24 pages.

Wand et al., “On the deep structure of information systems,” Information Systems Journal, Jul. 1995, 5(3):203-223.

Wang et al., “A Network Vulnerability Assessment Method Based on Attack Graph,” 2018 IEEE 4th International Conference on Computer and Communications, Dec. 7-10, 2018, Chengdu, China, 1149-1154.

Wang et al., “Big data analytics in cyber security: network traffic and attacks,” Journal of Computer Information Systems, Jan. 2020, 61(3):1-8.

Wang et al., “Exploring Attack Graph for Cost-benefit Security Hardening: A Probabilistic Approach,” Computers & Security, Feb. 2013, 32:158-169.

Ward et al., “Threat Analysis and Risk Assessment in Automotive Cyber Security,” SAE Int. J. Passeng. Cars Electron. Electr. Systems, May 2013, 6(2):507-513.

Wikipedia.org [online], “5G,” last updated Jul. 9, 2021, retrieved on Jul. 9, 2021, retrieved from URL<https://en.wikipedia.org/wiki/5G>, 29 pages.

Wikipedia.org [online], “Active Directory,” last updated Jun. 1, 2020, retrieved on Jun. 3, 2020, retrieved from URL <https://en.wikipedia.org/wiki/Active_Directory>, 14 pages.

Wikipedia.org [online], “Backward Chaining,” last updated Nov. 16, 2019, retrieved on Jun. 3, 2020, retrieved from URL <https://en.wikipedia.org/wiki/Backward_chaining>, 3 pages.

Wikipedia.org [online], “Breadth-first search,” last updated Jul. 21, 2021, retrieved on Jul. 28, 2021, retrieved from URL<https://en.wikipedia.org/wiki/Breadth-first_search>, 6 pages.

Wikipedia.org [online], “Cartesian Product,” last updated Feb. 28, 2020, retrieved on Jun. 3, 2020, retrieved from URL <https://en.wikipedia.org/wiki/Cartesian_product>, 9 pages.

Wikipedia.org [online], “Centrality,” last updated May 29, 2020, retrieved on Jun. 3, 2020, retrieved from URL <https://en.wikipedia.org/wiki/Centrality>, 15 pages.

Wikipedia.org [online], “Centrality,” last updated Oct. 18, 2020, retrieved on Oct. 26, 2020, retrieved from URL<https://en.wikipedia.org/wiki/Centrality>, 15 pages.

Wikipedia.org [online], “Common Vulnerabilities and Exposures,” last updated Jul. 6, 2021, retrieved on Jul. 9, 2021, retrieved from URL<https://en.wikipedia.org/wiki/Common_Vulnerabilities_and_Exposures>, 5 pages.

Wikipedia.org [online], “Common Vulnerability Scoring System,” last updated Jun. 21, 2021, retrieved on Jul. 9, 2021, retrieved from URL<https://en.wikipedia.org/wiki/Common_Vulnerability_Scoring_System>, 7 pages.

Wikipedia.org [online], “Depth-first search,” last updated Jun. 16, 2021, retrieved on Jul. 28, 2021, retrieved from URL<https://en.wikipedia.org/wiki/Depth-first_search>, 8 pages.

Wikipedia.org [online], “Digital twin,” last updated Jul. 8, 2021, retrieved on Jul. 9, 2021, retrieved from URL<https://en.wikipedia.org/wiki/Digital_twin>, 13 pages.

Wikipedia.org [online], “Eigenvector centrality,” last updated Dec. 1, 2020 retrieved on Jan. 11, 2021, retrieved from URL<https://en.wikipedia.org/wiki/Eigenvector_centrality>, 4 pages.

Wikipedia.org [online], “Flood Fill,” last updated Dec. 24, 2019, retrieved on Jun. 3, 2020, retrieved from URL <https://en.wikipedia.org/wiki/Flood_fill>, 7 pages.

Wikipedia.org [online], “Floyd-Warshall algorithm,” last updated Jan. 5, 2021, retrieved on Jan. 11, 2021, retrieved from URL<https://en.wikipedia.org/wiki/Floyd%E2%80%93 Warshall_algorithm>, 7 pages.

Wikipedia.org [online], “Forward Chaining,” last updated Nov. 18, 2019, retrieved on Jun. 3, 2020, retrieved from URL <https://en.wikipedia.org/wiki/Forward_chaining>, 3 pages.

Wikipedia.org [online], “Look-ahead (backtracking),” last updated May 23, 2020, retrieved on Jun. 3, 2020, retrieved from URL <https://en.wikipedia.org/wiki/Look-ahead (backtracking)>, 3 pages.

Wikipedia.org [online], “Natural language processing,” last updated Jun. 10, 2022, retrieved on Jun. 14, 2022, retrieved from URL<https://en.wikipedia.org/wiki/Natural_language_processing>, 13 pages.

Wikipedia.org [online], “Reachability,” last updated Oct. 22, 2021, retrieved on Jul. 13, 2022, retrieved from URL<https://en.wikipedia.org/wiki/Reachability>, 5 pages.

Wikipedia.org [online], “SCADA,” last updated Jun. 2, 2020, retrieved on Jun. 3, 2020, retrieved from URL <https://en.wikipedia.org/wiki/SCADA>, 12 pages.

(56) References Cited

OTHER PUBLICATIONS

Wikipedia.org [online], "Sigmoid function," last updated Dec. 25, 2020, retrieved on Jan. 11, 2021, retrieved from URL<https://en.wikipedia.org/wiki/Sigmoid_function>, 4 pages.

Wikipedia.org [online], "SWOT analysis," last updated Oct. 20, 2020, retrieved on Oct. 26, 2020, retrieved from URL<https://en.wikipedia.org/wiki/SWOT_analysis>, 8 pages.

Wikipedia.org [online], "Traffic congestion," last updated Oct. 5, 2020, retrieved on Oct. 26, 2020, retrieved from URL<https://en.wikipedia.org/wiki/Traffic_congestion>, 24 pages.

Wikipedia.org [online], "Traffic flow," last updated Oct. 19, 2020, retrieved on Oct. 26, 2020, retrieved from URL<https://en.wikipedia.org/wiki/Traffic_flow>, 41 pages.

Wikipedia.org [online], "Zero-day (computing)," last updated Oct. 16, 2020, retrieved on Oct. 26, 2020, retrieved from URL<https://en.wikipedia.org/wiki/Zero-day_(computing)>, 8 pages.

Wu et al., "A service-oriented architecture for business intelligence," Presented at Proceedings of the IEEE International Conference on Service-Oriented Computing and Applications (SOCA '07), Newport Beach, CA, USA, Jun. 19-20, 2007, 279-285.

X. Li, C. Zhang, T. Jung, J. Qian and L. Chen, "Graph-based privacy-preserving data publication," IEEE Infocom 2016—The 35th Annual IEEE International Conference on Computer Communications, 2016, pp. 1-9, doi: 10.1109/INF000M.2016.7524584. (Year: 2016).

Xie et al., "Using Bayesian Networks for Cyber Security Analysis," Proceedings of the 2010 IEEE/IFIP International Conference on Dependable Systems & Networks, Jun. 28-Jul. 1, 2010, Chicago, Illinois, 211-220.

Yi et al., "Overview on attack graph generation and visualization technology," 2013 International Conference on Anti-Counterfeiting, Security and Identification (ASID), Shanghai, China, Oct. 25-27, 2013, 6 pages.

You et al., "A Review of Cyber Security Controls from An ICS Perspective," Proceedings of 2018 International Conference on Platform Technology and Service (PlatCon), Jan. 29-31, 2018, Jeju, South Korea, 5 pages.

Zeng et al., "Survey of Attack Graph Analysis Methods from the Perspective of Data and Knowledge Processing," Hindawi Security and Communication Networks, Dec. 26, 2019, 2019:2031063, 17 pages.

Zhang et al., "Co-simulation framework for design of time-triggered cyber physical systems," 2013 ACM/IEEE International Conference on Cyber-Physical Systems (ICCPS), Philadelphia, Pennsylvania, Apr. 8-11, 2013, 119-128.

Zhang et al., "Optimal Decision-Making Approach for Cyber Security Defense Using Game Theory and Intelligent Learning," Security and Communication Networks, Dec. 23, 2019, 2019:3038586, 17 pages.

Zhao et al., "Attack graph analysis method for large scale network security hardening," J. Front. Comput. Sci. Technology, 2018, 12(2):263-273 (with English Abstract).

* cited by examiner

DISTRIBUTED DATA NODES FOR FLEXIBLE DATA MESH ARCHITECTURES

CROSS-REFERENCE TO RELATED APPLICATIONS

This application claims priority to U.S. 63/238,895, filed on Aug. 31, 2021, the disclosure of which is expressly incorporated herein by reference in the entirety.

BACKGROUND

As trusted digital information flow and derived insights become more important, the challenge of managing data at scale is evident. Rapid acceleration of data- and analytics-driven solutions for enterprises is complicated by the variety and volume of data sources and the existence of multiple methods for data consumption and utilization. Organizations use many data architecture approaches to handle the above challenges such as centralized, edge, data mesh, peer-to-peer, and others.

SUMMARY

Implementations of the present disclosure are directed to systems and methods for an Intelligent Data Mesh (IDM) that provides a Secured Data Mesh as a Service (SDMaaS) for both cloud and edge computing environments. The IDM is structured as a modular and composable mesh of data nodes with embedded data lineage management and zero trust security.

Centralized data architectures for IoT and big data aim at massive data collection for discovering new data patterns and training future artificial intelligence (AI) algorithms. Centralized architecture uses classical, digital-thread data collection for the creation of data lakes, data fabrics, and digital twins for representing, analyzing, and simulating real-world objects or concepts. This architecture relies on massive cloud computing and storage for multiple applications relying on the same cluster of data repository.

Edge data architectures aim to reduce the amount of data transmitted to a centralized system. A purpose of edge components is to provide insights faster, hence key activities are to connect, compute, or control the smart localized devices around it, according to the data architecture of connected edges or even within it. Accordingly, edge data architectures provide rapid and timely response to localized, connected devices, assets, and people, as well as locally contained analytics, even if disconnected from the cloud. Edge data architectures can be deployed for cost reduction, reduction of energy consumption, regulation, network bandwidth limitations, data security and privacy concerns, reduction of transmission costs, and more. Because computations are done locally and with reduced data size, this type of computation is leaner and provides faster response for localized data users. An example for an edge data approach is a system that brings cloud content near the areas where the is consumed to increase speed and agility, namely a push strategy, even at the level of a single factory.

Examples include Multi-Access Edge Computing (MEC) that drives connectivity for data push and pull as well as analytics at the edge. This proximity to managed data sources is efficient in key strategic areas such a location services, IoT augmented reality (AR), video analytics, etc. Industrial usages can be precision agriculture for improved crops yields while reducing carbon footprint, media and entertainment where crowd engagement is key that requires fast response and collaborative feedback, urban interactive engagement with citizens for navigation commercials and other rapid response and just-in-time localized offering.

Centralized data architectures have unified, complex "Extract, Transform, and Load" (ETL) pipelines and limit the customization of massive data consumption to multiple use cases. Edge data architectures replace the traffic load with tailored use cases yet lack the data harmonization and integrity view that a Centralized system can provide. Centralized data architectures handle well issues of limitations in data movements subject to data sovereignties, regulations and other restriction polices. Edge data architectures that do not need to move all the data, introduce maintenance and configuration difficulties at scale regarding immediate conformance to data governance, regulation, and security policies.

Accordingly, a data mesh approach can be implemented based on decentralizing the data location and ownership, embracing a domain-oriented approach to enable different teams to consume data from distributed data sources in a standard manner.

Data mesh architectures aim to create a supply chain of data and analytics within an enterprise. Thus, data mesh architectures enable a divide-and-conquer approach for consuming and providing data, while enforcing a common data format for the interoperability between the data sources and a data orchestration process. Data mesh can act as a wrapping layer over edge, centralized, and hybrid architectures.

Data mesh is an enterprise data architecture that adapts and applies the learnings in building distributed architectures to the domain of data. Data mesh recommends creating self-serve data infrastructure, treating data as a product, and organizing teams and architecture based on business domains.

Data mesh can replace centralized and monolithic data with data-as-a-product and distributed sources. Connectivity technology within data assets can be defined in order to enable ease of integration in terms of data ontological syntax as well as of analytics consumption. A data mesh approach is aimed at providing analytics at scale by moving source data to distributed locations to be consumed according to a user request. This architecture thus enables data utilization growth while using orchestration and data infrastructure tools. In a data mesh architecture, a data source can be considered an edge system, exposing only the relevant information.

The selection of the above architectures depends on properties including volume, velocity, variety, veracity, and value. The selection also depends on the type of analytics needed to be performed, the selected ontology that can match certain analytics, and on the type of data stores that exist underneath.

The disclosed techniques employ a flexible secured data architecture that is configurable to any former data architectures and to new data architectures. The disclosed techniques employ central control to employ a knowledge graph centralized design of reusable and modular ontologies, analytics, and data policies.

The disclosed techniques employ distributed computation and storage to activate data stores and form a mesh of interoperable data nodes on cloud and edge(s). The disclosed subject matter employs embedded data security to ensure interlaced data access control and trust tracking within the managed IDM.

Advantages of the disclosed techniques include a reduction of data load and cost of transmission of data, providing an endless data scale, and providing rapid deployment and quick time to value for new data systems.

In some implementations, actions include obtaining first configuration data for a data mesh including a plurality of data nodes, each data node of the plurality of data nodes is configured to receive instructions and perform operations based on the instructions, the operations including processing input data and producing output data; simulating operations of the data mesh to generate simulation results using the first configuration data; determining, based on the simulation results, that the first configuration data satisfies criteria for configuring the data mesh; and generating, from the first configuration data and based on the simulation results, a set of instructions for the plurality of data nodes of the data mesh; and configuring the data mesh based on the first configuration data by deploying the set of instructions to the plurality of data nodes of the data mesh.

Other implementations of this aspect include corresponding systems, apparatus, and computer programs, configured to perform the actions of the methods, encoded on computer storage devices.

These and other implementations can each optionally include one or more of the following features: the data mesh has a first topology, configuring the data mesh based on the first configuration data comprises changing the data mesh from the first topology to a second topology, the first topology and the second topology identify connections between the plurality of data nodes and the second topology is different from the first topology; the first topology and the second topology each include one or more of a group of topologies including centralized topology, edge topology, data mesh topology, peer-to-peer topology, federated topology, pipe and filter topology, and value chain topology; each instruction of the set of instructions is designated for a respective data node of the data mesh; at least one instruction of the set of instructions is designated for all data nodes of the data mesh; deploying the set of instructions to the plurality of data nodes of the data mesh comprises deploying a first instruction to a first data node of the plurality of data nodes; receiving data indicating a data access policy for the data mesh, deploying the set of instructions to the plurality of data nodes of the data mesh aligns the data mesh to comply with the data access policy for the data mesh; receiving data indicating a data access policy for the data mesh, obtaining the first configuration data for the data mesh comprises determining, based on the data indicating the data access policy for the data mesh, a first configuration for the data mesh that complies with the data access policy; generating the set of instructions for the plurality of data nodes of the data mesh comprises generating, for each of the plurality of data nodes, an instruction to reconfigure the data node to align with the first configuration, and deploying the set of instructions to the plurality of data nodes of the data mesh causes reconfiguration of the data mesh to the first configuration that complies with the data access policy; the data access policy indicates, for a type of data, a subset of the plurality of data nodes that is permitted to access the type of data; processing the input data comprises: processing first input data received from a data node of the data mesh; and processing second input data received from a raw, source, or edge data source; generating, from the first configuration data and based on the simulation results, the set of instructions for the plurality of data nodes of the data mesh comprises: determining, based on the simulation results, a predicted impact of configuring the data mesh based on the first configuration data across the plurality of data nodes of the data mesh; and generating the instructions for the plurality of data nodes based on the predicted impact; the first configuration data indicates a change to a configuration of a first data node, the actions including: evaluating the first configuration data to determine a predicted impact of the change to the configuration of the first data node on a second data node; and based on the predicted impact, generating the set of instructions including generating a first instruction designated for the first data node and generating a second instruction designated for the second data node; the first configuration data indicates a first configuration of the data mesh, and deploying the set of instructions to the plurality of data nodes of the data mesh aligns the data mesh with the first configuration; an instruction of the set of instructions indicates, for a first data node, at least one data node for providing the input data to the first data node; an instruction of the set of instructions indicates, for a first data node, at least one data node for receiving the output data from the first data node; an instruction of the set of instructions indicates, for a first data node, a destination of the output data from the first data node; the input data includes raw, source, or edge input data, and an instruction of the set of instructions indicates, for a first data node, a data source for providing the raw, source, or edge input data to the first data node; each data node includes a plurality of reconfigurable modules including one or more of a data node analytics module, a digital twin module, and a core infrastructure module; each data node includes a reconfigurable content bundle module configured to store instructions for at least one of data model, data analysis, data transformation, or data security; each data node is configured to update the stored instructions of the respective content bundle module in response to receiving an instruction of the set of instructions.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description, the drawings, and the claims.

DESCRIPTION OF DRAWINGS

Like reference symbols in the various drawings indicate like elements.

DETAILED DESCRIPTION

Implementations of the present disclosure are directed to systems and methods for an Intelligent Data Mesh (IDM) that provides a Secured Data Mesh as a Service (SDMaaS) for both cloud and edge computing environments. The IDM is structured as a modular and composable mesh of data nodes with embedded data lineage management and zero trust security.

In some implementations, actions include obtaining first configuration data for a data mesh including a plurality of data nodes, each data node of the plurality of data nodes is configured to receive instructions and perform operations based on the instructions, the operations including processing input data and producing output data; simulating operations of the data mesh to generate simulation results using the first configuration data; determining, based on the simulation results, that the first configuration data satisfies criteria for configuring the data mesh; and generating, from the first configuration data and based on the simulation results, a set of instructions for the plurality of data nodes of the data mesh; and configuring the data mesh based on the first configuration data by deploying the set of instructions to the plurality of data nodes of the data mesh.

Figure 1:
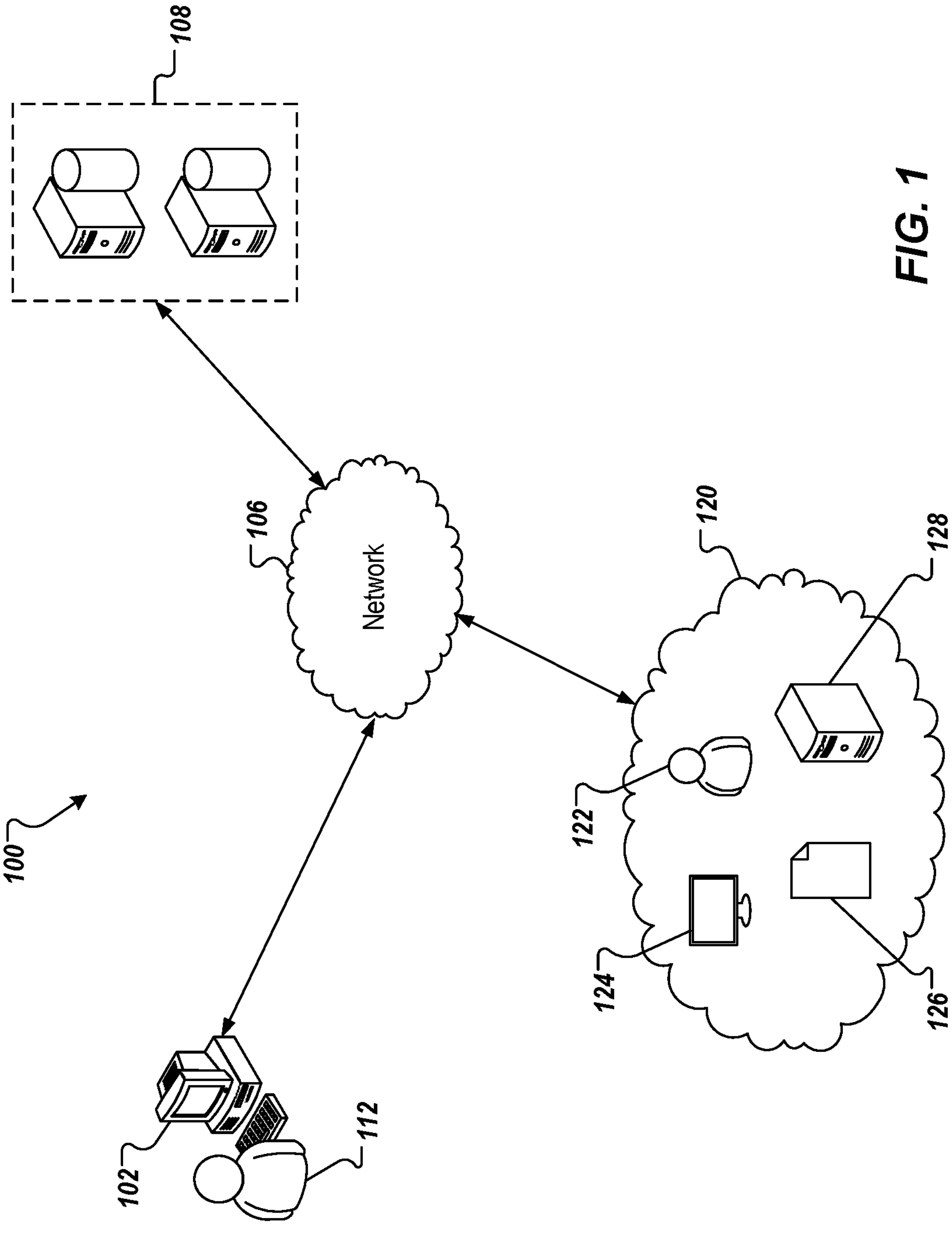
FIG. 1 depicts an example architecture that can be used to execute implementations of the present disclosure.

FIG. 1 depicts an example architecture 100 in accordance with implementations of the present disclosure. In the depicted example, the example architecture 100 includes a client device 102, a network 106, and a server system 108. The server system 108 includes one or more server devices and databases (e.g., processors, memory). In the depicted example, a user 112 interacts with the client device 102.

In some examples, the client device 102 can communicate with the server system 108 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 108 includes at least one server and at least one data store. In the example of FIG. 1, the server system 108 is intended to represent various forms of servers including, but not limited to a web server, an application server, a database server, an API gateway server, a proxy server, a network server, and/or a server pool. In general, server systems accept requests for application services and can provide services, data, analytics, or any of these to any number of client devices (e.g., the client device 102 over the network 106). In accordance with implementations of the present disclosure, and as noted above, the server system 108 can host an agile security platform.

In the example of FIG. 1, an enterprise network 120 is depicted. The enterprise network 120 represents a network implemented by an enterprise to perform its operations. In some examples, the enterprise network 120 represents on-premise systems (e.g., local and/or distributed), cloud-based systems, and/or combinations thereof. In some examples, the enterprise network 120 includes IT systems and OT systems. In general, IT systems include hardware (e.g., computing devices, servers, computers, mobile devices) and software used to store, retrieve, transmit, and/or manipulate data within the enterprise network 120. In general, OT systems include hardware and software used to monitor and detect or cause changes in processes within the enterprise network 120 as well as store, retrieve, transmit, and/or manipulate data. In some examples, the enterprise network 120 includes multiple assets. Example assets include, without limitation, users 122, computing devices 124, electronic documents 126, and servers 128.

Figure 2:
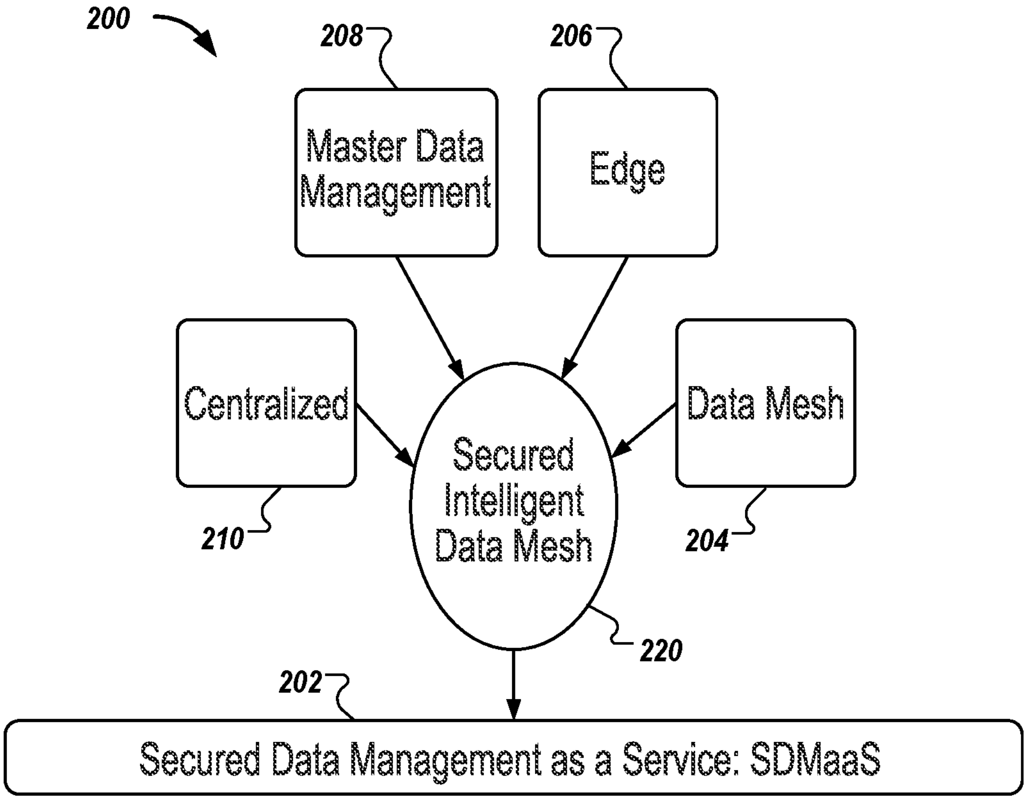
FIG. 2 depicts an example conceptual architecture of Secured-Data-Management-as-a-Service.

FIG. 2 depicts an example conceptual architecture 200 of Secured Data Management as a Service. Intelligent data architectures can be provided through SDMaaS. Expanding on data mesh 204, edge computing 206, master data management 208, and centralized data 210 architectures, as well as the formation of data lakes, lake houses, and digital twins, an overarching IDM 220 data architecture can be provided.

The IDM 220 provides a SDMaaS 202 for cloud and edge computing environments, structured as a modular and composable mesh of data nodes with embedded data lineage management and zero trust security. Multiple data nodes can follow the same architecture blueprint, acting as peers of composable building blocks, as described in greater detail with reference to FIGS. 3 and 4.

The data nodes can form any type of data architecture topology and are configured externally by ontological and domain schemas with extended analytical capabilities using graph modeling tools. A data node grid can be composed with any type of topological dependencies, while consuming raw, source, and/or edge data from third-party resources, and data produced by data node peers. A data topology is an approach for classifying and managing real-world data scenarios. The data scenarios may cover any aspect of an enterprise from operations, accounting, regulatory and compliance, reporting, to advanced analytics, etc. A data topology can specify a flow of data between nodes of a data mesh.

Using the SDMaaS 202, the data architecture topologies can be tuned to consumption needs. The data architecture topologies are adaptable and adjustable to other usages, and flexibility of the data architecture is be maintained. In addition, according to the topological structure of connected providers and consumers of data, data integrity can be maintained related to the data service quality derived by data flow topology.

Techniques related to trust and data lineage can be used to synchronize distributed information between several data repositories or sources, located in different locations in a trusted manner. In particular, embedded data security can be enabled within the data flow, to track the origin of the data and its pathways, as well as ensure localized access control at the repository level over consumption and provisioning of data. Even more so, the topology can contain built-in security controls to enforce security policies. Embedded data security ensures interlaced data access control and trust tracking within the managed IDM.

Data flow can be balanced and adjusted between data nodes. Disclosed techniques can be used to decide which data element should reside where, including related analytics. Regardless of the topology, centralized data model management can be maintained during the design-and-plan phase such as via the usage of ontological approaches, while still ensuring distributed data compute and store. As such, centrally managed data governance can be enforced while the data computation remains in a distributable manner. Central control can be implemented by employing a centralized design of reusable and modular ontologies, analytics, and data policies. Distributed computation and storage can be used to activate data stores and form a mesh of interoperable data nodes on cloud and edge.

Techniques for knowledge alignment can be employed. When the entire system health and integrity depends on multiple data sources to provide a comprehensive view, the disclosed techniques provide a way to provide a view of multiple data models activated by multiple ontological schemas, without the need to understand and operate the data flow and management technology.

Techniques for data harmonization and fusion can be employed. When data is collected from several different sources yet relate to the same object, the data can be harmonized, de-duplicated, and fused, as the data sources increase at scale. A security-related information of a trusted data source alongside data lineage can be leveraged for smart data fusion and data-in-motion rules, while ensuring data integrity.

Techniques for scalable and flexible data mesh topology can be employed. Flexible secured data architecture can be configurable to any former data architecture and can unlock new data architectures.

A data platform technology can be quickly adjusted to either a Centralized, edge, data mesh, peer-to-peer or any other new unlocked data architectures that can enable different usages in a fast and easy manner. Such adjustments can be configured externally to the technology implementation, allowing users to control the implications and usage of the outcomes.

The Secured IDM is an evolution and combination of several data architectures, and in particular, classical data mesh, edge, and centralized. Attributes of an IDM include a flexible secured architecture that allows the mesh to be configurable in real-time to any data architecture while unlocking new topologies.

Attributes of an IDM includes centralized control that employs a virtual graph centralized design of modular ontologies, analytics and inferences, policy rules for security compliance and data-in-motion. The centralized data modelling ensures reusable modular ontologies and accelerates content for solution-specific ontologies, as well as reusability of common analytics configuration, adjusted to the domain-specific language of the solution space.

Attributes of an IDM includes distributed computation and storage to implement and activate mesh connected intelligent data nodes on cloud and edge(s), with a wiring and data flow direction that can be adjusted or intercepted on-the-fly. The mesh can grow without scale limitations. The number of data nodes instances can vary according to data size limitations, performance, governance, resiliency, and any other data quality attribute that is balanced with the system requirements.

Attributes of an IDM include embedded data security as an integrated part of the data flow within the mesh, ensuring data flow traceability and manipulation steps. Embedded data security includes back tracing to the origin of the data, hence supporting information fusion needs and security controls.

An IDM employs multiple environments, on edge and on the cloud, that can support different vendors and types of compute, storage, data processing services, microservices, and serverless technologies. Such environments are dynamically provisioned and managed on demand. Automation and resources management are performed on cloud platforms as Infrastructure as a Service, and SDMaaS is an extension. This dynamic management applies to smart edge(s) deployment, IoT devices, data stores, analytics engines, orchestration engines, and related native cloud applications. SDMaaS can be implemented using wiring and distributed data processing that adheres to a centralized ontological control.

Figure 3:
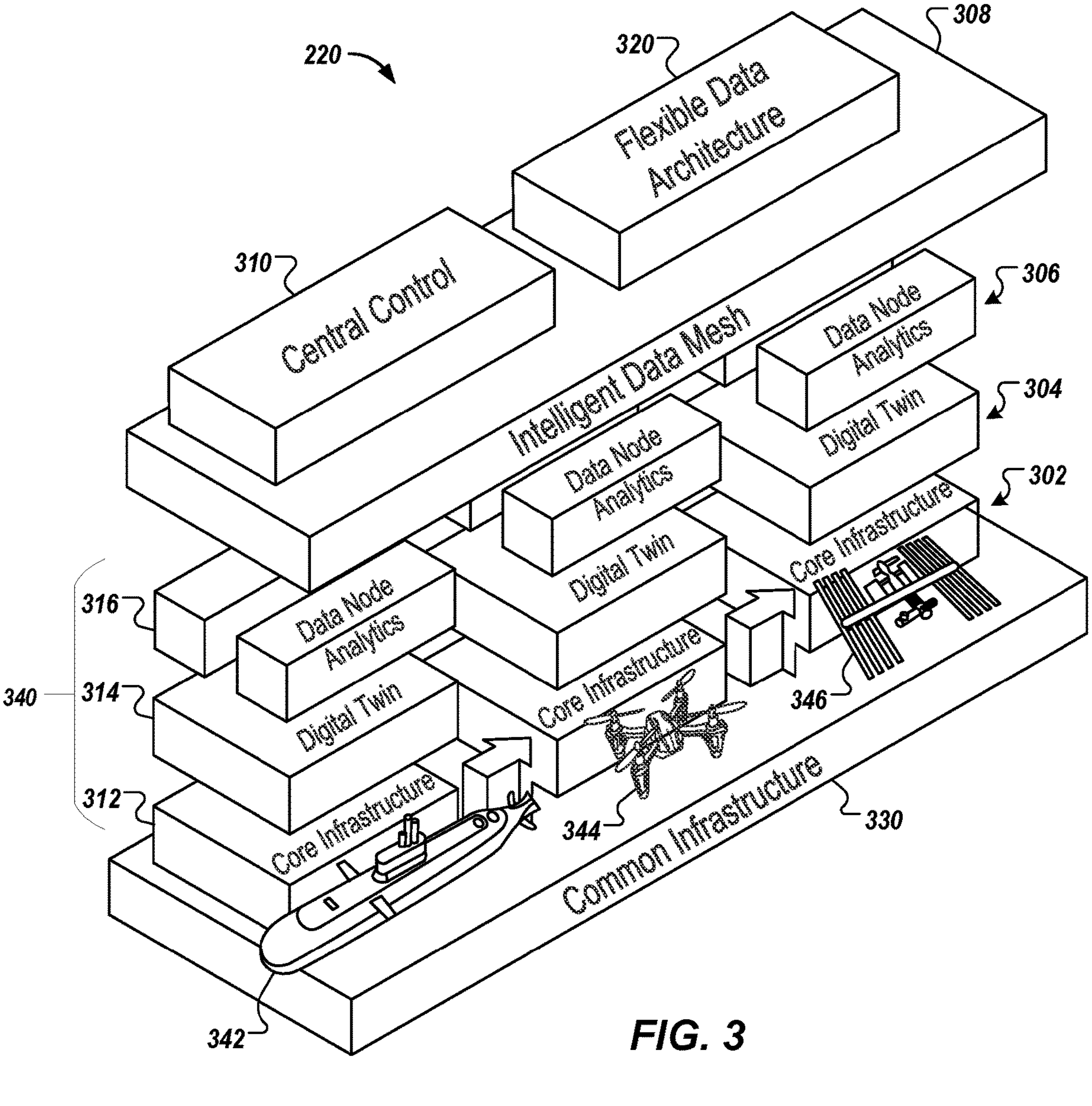
FIG. 3 depicts an example conceptual IDM, constructed from composable data nodes.

FIG. 3 depicts an example conceptual IDM 220 constructed from composable data nodes. Each data node in the IDM 220 includes a core infrastructure 302, a contextual digital twin 304, and data node analytics 306. The data nodes can be supported by a common infrastructure 330, e.g., cloud, fog, edge infrastructures. As depicted in FIG. 3, a vertical stack of blocks represents a single data node within the IDM 220. For example, a stack of blocks including core infrastructure 312, digital twin 314, and data node analytics 316 composes a data node 340 corresponding to a submarine 342. The IDM 220 also includes a data node corresponding to an aerial drone 344 and a data node corresponding to a satellite 346.

The IDM 220 integrates the data nodes using distributed topology and analytics 308. The IDM 220 is managed through central control 310, incorporating graph and modular ontologies. The IDM 220 can be reconfigured using flexible data architecture 320. The flexible architecture 320 can be implemented to construct and reconfigure individual data nodes of the IDM 220. Constructing or reconfiguring a data node can include selecting, from multiple core infrastructures 302, a particular core infrastructure of the data node. Constructing or reconfiguring a data node can include selecting, from multiple data node analytics 306, a particular data node analytics to be performed by the data node. Constructing or reconfiguring a data node can include selecting, from multiple digital twins, a particular digital twin to represent the data node. The flexible architecture 320 can add data nodes to the IDM 220 and can remove data nodes from the IDM 220. In some examples, the flexible architecture 320 can modify configurations of individual data nodes. In some examples, the flexible architecture 320 can modify groups of data nodes of the IDM 220. For example, the flexible architecture 320 can implement a change that modifies all data nodes of the IDM 220.

A data node can encapsulate a persistency system that is instantiated and activated in the form of a contextual digital twin 304. The contextual digital twin 304 can represent the data sources of the data node. In some examples, a data node can encapsulate a persistency system that is instantiated and activated in the form of a data persistency system that is disconnected from a real environment.

A data node can activate its embedded data node analytics 306 on demand or on schedule. In some examples, the data node adds time stamps and metadata for newly added raw, source, or edge data. In some examples, the data node appends its data stamp, to an existing data envelope, ensuring traceability of a digital thread to the data source. The traceability can be used to ensure data integrity for security, data lineage, data training, and/or data fusion needs.

Figure 4:
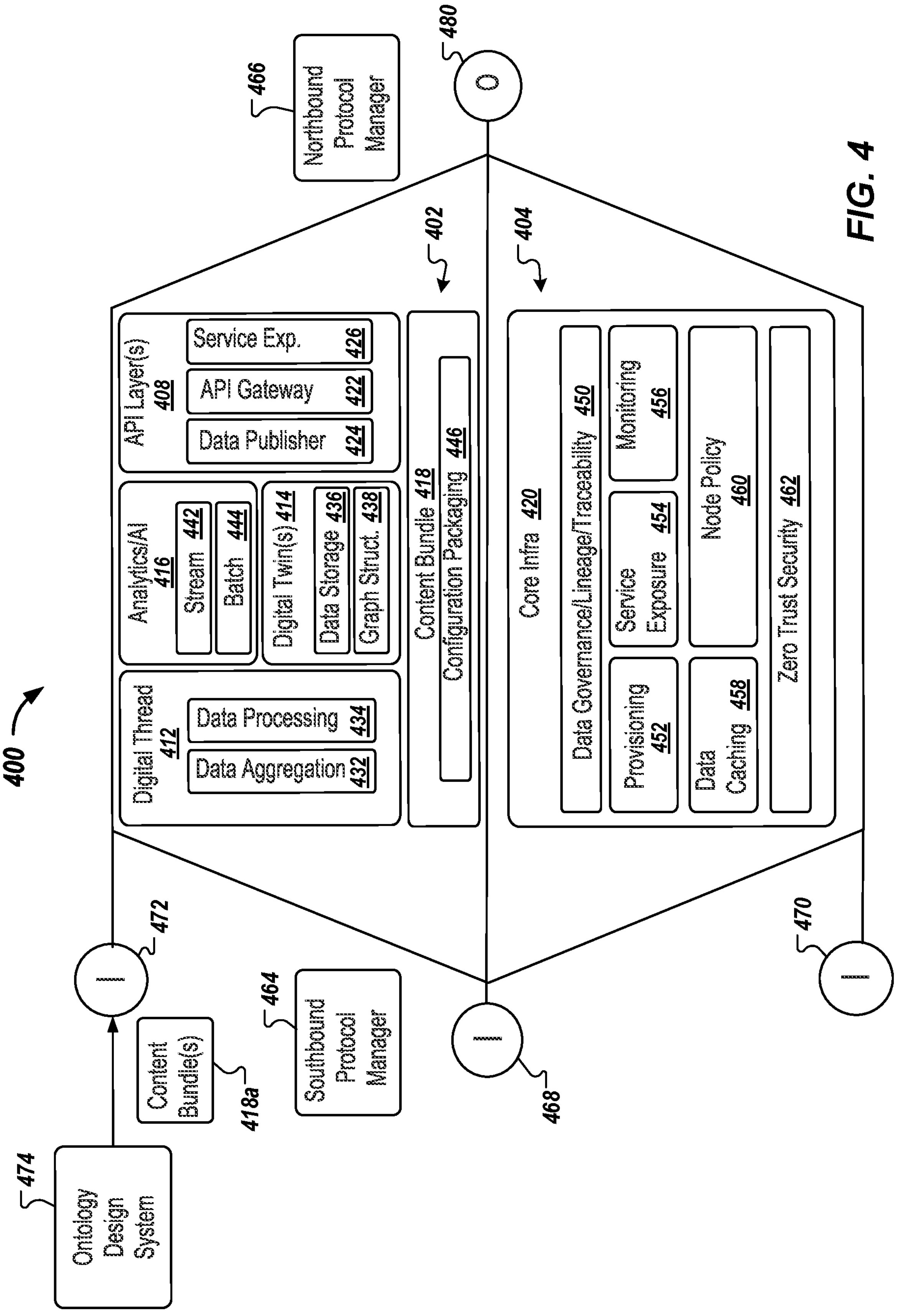
FIG. 4 depicts example reconfigurable modules of a composable data node.

FIG. 4 depicts example reconfigurable modules of a composable data node 400. The composable data node 400 is composed of data services 402 and infrastructure services 404.

Data service elements within the data node 400 include an API layer 408, a digital thread module 412, a digital twin module 414, a data node analytics module (analytics/AI module 416), and a content bundle module 418.

The API layer 408 enables an authorized access to a standardized application and server-provided interface for controlling service requests, population of Digital Twin instances, and persistency. The API layer 408 includes a data publisher 424 and service exposure 426. The API layer 408 includes an API gateway 422. The API gateway 422 receives requests, authorizes requestors, and triggers streaming data, data response, and analytics activation. The API gateway 422 can delegate analytics to other nodes.

The digital thread 412 performs data processing 432 and data aggregation 434. The digital thread 412 moves data between the API gateway 422 in and out of the node 400, into the persistency or streaming system, and exposes analytics API. The digital thread 412 is the node's internal orchestration engine. The data thread 412 contains the data transmission, adds metadata such as a security timestamp and tokens, ensures data integrity between consumed, managed, and provided data entities, and transverses data between cache and persistent storage.

The digital twin 414 can include one or more of multiple digital twins 304 of the IDM 220. The digital twin 414 includes data storage 436 and graph structures 438. The data storage 436 is tuned for a graph database, with possible extension to NoSQL, relational, object store, file system, and other types. The digital twin data schema adheres to an ontology created by an ontology design system. The digital twin 414 has a digital twin builder component that constructs the twin according to a provided ontological schema, related inferences, and data stream and sources fed into the node 400.

The analytics/AI module 416 contains a ready-to-be-activated analytics library. The analytics/AI module 416 can include one or more of the data analytics 306 of the IDM 220. The analytics library can be stored as code to be activated on the digital twin 414, or as a remote invocation for ready-to-respond microservices and AI algorithms. The analytics/AI module 416 can, on-demand, generate a data query on the graph database, extract data, and run additional analytics on the extracted data. The analytics/AI module 416 can perform stream operations 442 and batch operations 444. The analytics operations performed by the analytics/AI module 416 can be prescribed by instructions received, e.g., from the ontology design system 474. The Analytics/AI module 416 can update the result within the digital twin or dispatch the result to the API Layer 408 for further publishing to registered and authorized consumers.

The data node 400 includes a reconfigurable content bundle module (content bundle 418). The content bundle 418 functions as a catalog of configurations that can be used to activate the data node 400. The content bundle 418 can be provided as input to the data node 400, e.g., through distributed topology and analytics 308. The content bundle 418 can perform configuration packaging 446. The content bundle 418 can have instructions for solving a problem, handling data transformation, or securing the data. Solving the problem may require a semantic graph data model of composite ontologies, analytics ontologies that define which analytics should be activated or location of microservices, and the structure of the data mesh. Transformation instructions can be a list of mapped data sources to data entities, and OWL policies or inference rules for data-in-motion or other data restrictions such as anonymization and normalization. Security instructions can include the information needed for data travel and time stamp for data trust and lineage management, as well as lists of requesters and providers, privacy location limitations, and others.

Infrastructure services 404 within the data node 400 can be implemented by a core infrastructure module (core infrastructure 420). The core infrastructure 420 can include one or more of multiple core infrastructures 302 of the IDM 220. The core infrastructure 420 can include data governance/lineage/traceability 450, provisioning 452, service exposure 454, monitoring 456, data caching 458, node policy 460, and zero trust security 462.

The node 400 includes a southbound protocol manager 464 to manage input protocols and a northbound protocol manager 466 to manage output protocols. The node 400 can consume data from other nodes through input node 468. The node 400 can consume external data, e.g., telemetry data, from input node 470. The node 400 can output data through output node 480.

The node 400 can be externally configured. The node 400 can receive input configuration data through input node 472. The input configuration data can include, for example, content bundles 418*a*. The content bundles 418*a* can be provided to the data node 400 through input node 472, and used to update the stored content bundle 418. The input configuration data can be provided by an ontology design system 474.

Figure 5:
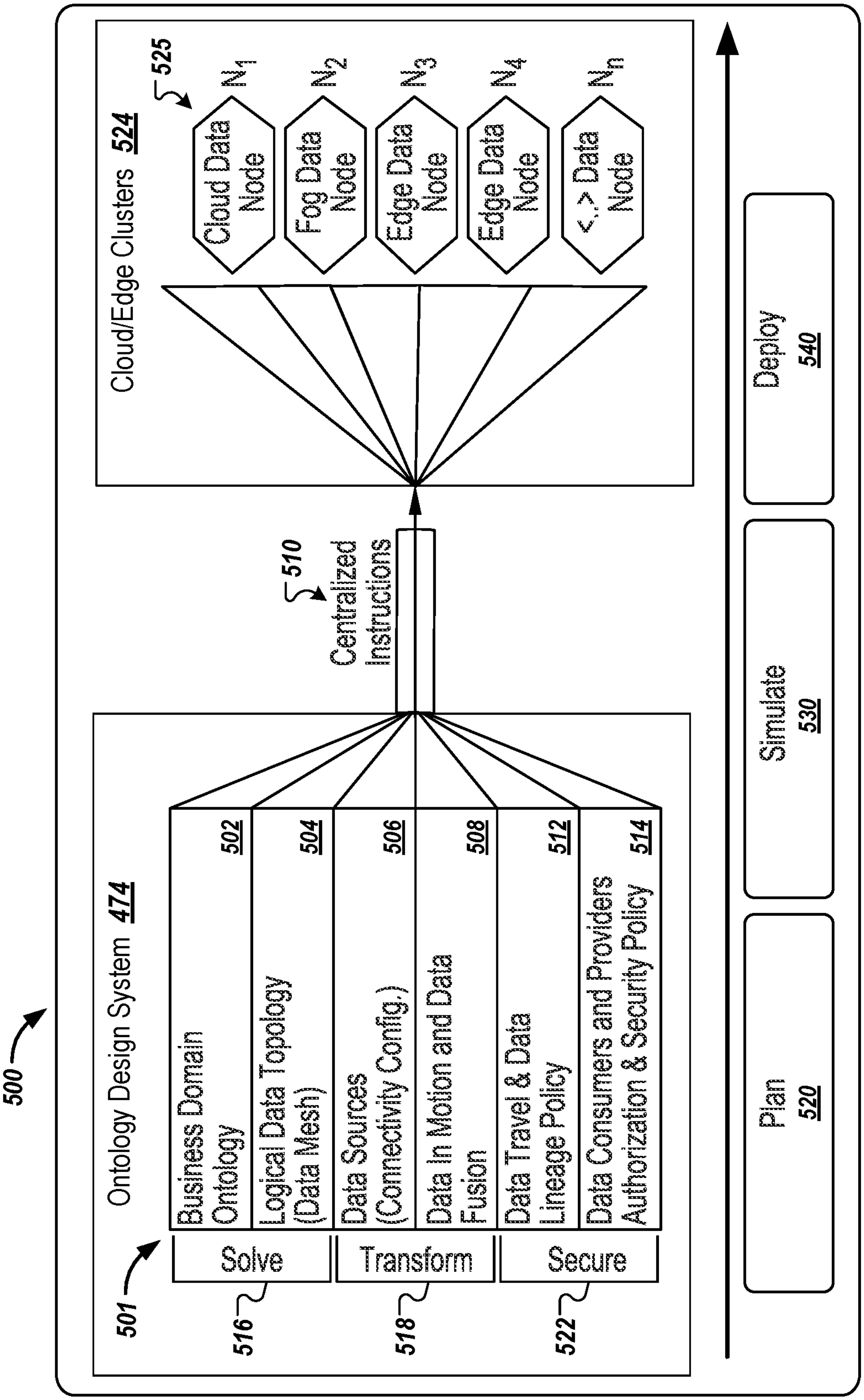
FIG. 5 depicts example conversion from multiple layered centralized instructions to distributed data node content bundles over cloud and edge clusters.

FIG. 5 depicts an example process 500 for generating centralized instructions for data nodes of an IDM. The process 500 can be used to provide distributed data node content bundles from multiple layered centralized instructions 510 over cloud and edge clusters 524. The centralized instructions 510 can include instructions for each data node of an IDM. The instructions for a data node can be provided to the data node, e.g., as input through input node 472.

The process 500 includes phases of planning 520, simulating 530, and deploying 540. The process 500 can be performed by a design system, e.g., the design system 474. In the planning phase 520, the centralized instructions 510 are generated based on multiple factors 501. The factors 501 include business domain ontology 502, logical data topology 504, data sources 506, data in motion and data fusion 508, data travel and data lineage policy 512, and data authorization and security policy 514.

Business domain ontology 502 and logical data topology 504 specify how data is processed or solved 516 by the data nodes of the IDM. The business domain ontology 502 identifies data that is to be managed by each node, e.g., in a set of nodes 525 including nodes $N_{1-n}$. The set of nodes 525 include cloud nodes, fog nodes, and edge nodes. The logical data topology 504, or data mesh topology, identifies connections between the set of nodes. For example, for a particular node, the logical data topology 504 can specify input and output connections for the node. The logical data topology 504 can specify, for example, that the node $N_2$ receives input data from node $N_1$ and outputs data to node $N_3$.

The data sources 506 and the data in motion and data fusion 508 specify how data is transformed 518. The data sources 506 can include a connectivity configuration and can identify sources of data to be input to nodes of the IDM. For example, the data sources 506 can identify sources of raw, source, or edge data for each node of the set of nodes 525. The data in motion and data fusion 508 specify how data is exported and organized in the IDM.

Data travel and data lineage policy 512 and data authorization and security policy 514 specify how data is secured 522. The data travel and data lineage policy 512 identify a history of the data that is processed by the IDM. The data authorization and security policy 514 identifies access restrictions for the data. The security policy 514 can be a data access policy that is based on a regulatory policy, e.g., General Data Protection Regulation (GDPR) or Health Insurance Portability and Accountability Act (HIPAA) privacy policy. For example, the data authorization and security policy 514 can specify which nodes have access to the data. The security policy 514 can indicate a subset of nodes that have access to a type of data. The data authorization and security policy 514 can be based on rules and regulations, e.g., as specified by user input. The data accesses of a data node or subset of data nodes can vary over time, and can vary based on changes in status and/or location of the data node.

During the planning phase 520, users can provide input, e.g., specifying connections between data nodes and data sources. The design system can receive, validate, and verify the user input based on the factors 501. In some examples, validated designs specified by user input can be simulated. During simulation, 530 the design system 474 can determine predicted impacts and effects of a specified change on other factors and on other nodes.

As an example, a user may provide an input design configuration specifying a particular data source 506, and specifying a topology including the node $N_2$ should receiving input data from node $N_1$ and outputting data to node $N_3$. The design system can evaluate the user input based on the factors 501 and may validate the design configuration and can simulate the design configuration. The design system may determine, based on simulation 530, that implementing the design configuration will affect instructions for another node, e.g., node $N_4$. The design system may determine that the design configuration will also effect data in motion and data fusion 508. The design system can therefore generate a set of centralized instructions 510 that consider cascading effects of the input design configuration on each of the factor 501 and on each of the nodes $N_{1-n}$.

The design system can be implemented to build new IDM architectures. For example, an IDM can be built from the bottom-up by making connections between nodes. In some examples, each new connection can be evaluated during a planning phase 520 using the factors 501. The design system can therefore optimize the system and seamlessly integrate the nodes.

In some examples, the design system can perform preemption of design changes. For example, based the security policy 514, a particular data node may be preempted from having access to a particular data source. Thus, a user will be prevented from requesting authorization for the particular data node to access the particular data source.

In some examples, the design system can perform prevention of design changes, for example, the design system may permit a user to request a particular change and perform a validation process during a planning phase 520. If the change can be validated based on the factors 501, the design system can permit the change. If the change cannot be validated based on the factors 501, the design system can prevent the change from being implemented. In some examples, the design system may perform simulation 530 of a validated change prior to deployment 540 of the change. Deployment 540 of the change can include sending a set of centralized instructions 510 to the data nodes 525 in parallel.

The design system can be implemented to modify existing IDM architectures. In an example modification of an existing architecture, an IDM architecture exists with a current set of centralized instructions 510 and a current set of nodes $N_{1-n}$ A policy change may occur that affects a data access policy, e.g., the security policy 514. A user can input the change to the security policy 514. The design system can implement the policy from the top-down, accounting for predicted impacts on individual nodes and predicted impacts on the data mesh as a whole. The design system propagates the policy changes as a set of rules by which the node connections are evaluated and updated. The design system can evaluate the change to the security policy 514 by performing planning operations 520 using the factors 501. The design system can also simulate 530 operations of the IDM with the change implemented. The design system can determine effects of the security policy change on the factors 501 and on the nodes 525. In this way, the design system can evaluate all intended and unintended effects of the change on the entire architecture, and generate centralized instructions 510 that account for the cross-system effects.

The design system can generate a set of updated centralized instructions 510. The updated centralized instructions 510 reconfigure the set of nodes 525 to comply with the security policy update. The design system can deploy 540 the new architecture by providing the updated centralized instructions 510 to the set of data nodes 525. The updated centralized instructions 510 can implement the new policy, e.g., by preventing connections being made between a node and a data source that the node is not permitted to access. Upon deployment of the instructions, the nodes 525 automatically reconfigure according to the deployed instructions.

In another example, a particular data source 506 may undergo a change in classification. The change in classification of the data source 506 may change the security policy 514. The change in classification of the data source 506 and/or the change in the data security policy may change which nodes of the set of nodes 525 are permitted to access the data source. For example, the security policy 514 may indicate a subset of the set of nodes 525 that are permitted to access a type of data. The design system can perform planning 520 by evaluating the change in classification using the factor 501. The design system can perform simulation 530 to holistically evaluate the predicted effects of the change on the architecture. The design system can then deploy 540 the change by issuing updated instructions 510 to the set of nodes 525. Upon deployment of the instructions, the nodes 525 automatically reconfigure according to the deployed instructions.

The process 500 can be used to address multiple concerns of data architectures simultaneously. The process 500 can perform rapid deconfliction of new connections and of changes to connections within an IDM. The process 500 can perform deconfliction between the factors 501 and between the requirements of each of the nodes 525. The process 500 can be used to dynamically reconfigure an IDM for data flow. The connections specified by the centralized instructions 510 can be flexible and impermanent.

Using the process 500, distributed data systems are secure. The centralized instructions 510 can be updated over time to control which data nodes can access which data, and the time during which the data nodes can access the data. Access permissions can be changed over time, as changes to data occur, as changes to nodes occur, and as changes to policy occur.

The process 500 can be used to reconfigure an IDM into different types of data architectures. Since the centralized instructions 510 includes instructions for business domain ontology 502 and logical data topology 504, a change in the instructions to individual nodes can change the overall configuration of the IDM. Thus, by making adjustments to instructions provided to each node of the set of nodes 525, the set of nodes 525 can be reconfigured to form any architecture (e.g., centralized, edge, peer).

As the behavior of all data nodes is centrally controlled by a configurable instruction, the mesh can be defined to gradually produce value through its network of data APIs. These wired data node peers can form any data topological structures, such as data cascading, federated, or collaborated modes supporting data or distributed analytics. As such, different topology configurations can serve all the above architectures, as well as provide new architectures.

FIGS. 6A to 6F depict example data node topology configurations. Topology configurations can include, for example, a single-node configuration, a value chain node configuration, a federated node configuration, a recursive node configuration, a data mesh/edge configuration, and a peer-to-peer node configuration. A data mesh can have a topology that includes any combination of these topology configurations and other topology configurations.

Figure 6A:
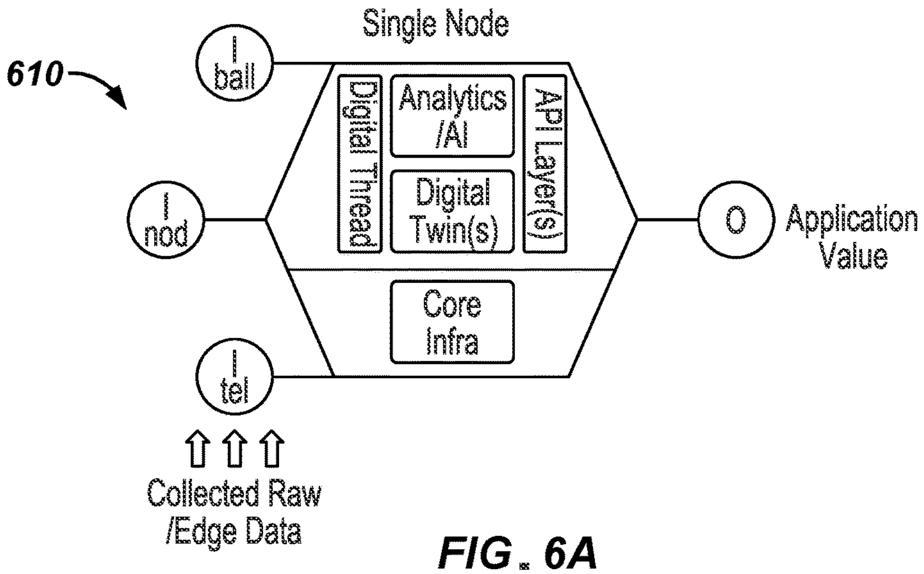
FIGS. 6A to 6F depict example data node topology configurations.

FIG. 6A shows an example single-node configuration 610. The single-node configuration 610 is a single node that fits a centralized data architecture, receives all its data from raw, source, or edge data sources and third parties, and hence acts as a centralized data architecture or a classical cloud data architecture. The single node of the configuration 610 outputs data to a destination. Instructions designated for the single node can indicate a destination of the output data from the single node. Examples of a single-node configuration 610 can include IoT streaming from connected devices, or the creation of data lakes and big data repositories for the enablement of Business Intelligence OLAP.

Figure 6B:
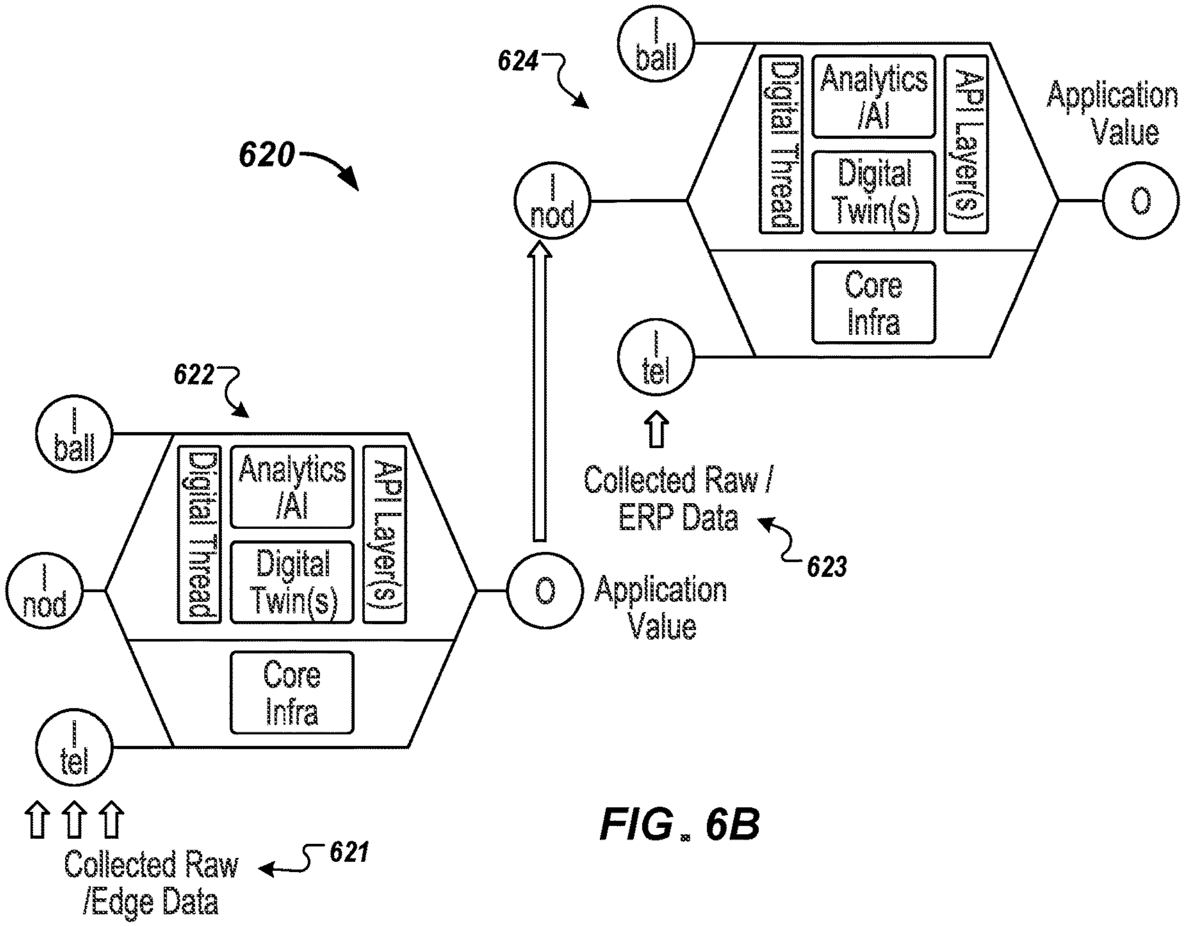

FIG. 6B shows an example value chain node configuration 620. A value chain node can act as a pipe and filter data grid. Each step can add value and manipulation to the inserted data, as well as enrich and augment from additional raw sources. For example, a first node 622 receives raw, source, or edge data 621 and outputs data to a second node 624. The second node 624 receives data from the first node 622 and also receives raw, source, or edge data 623. Examples of a value chain node configuration include gradual video and signal streaming analysis and enrichment, activation of cascading algorithms of map-reduce, and any form that gradually replaces the data amount with data inferences.

Figure 6C:
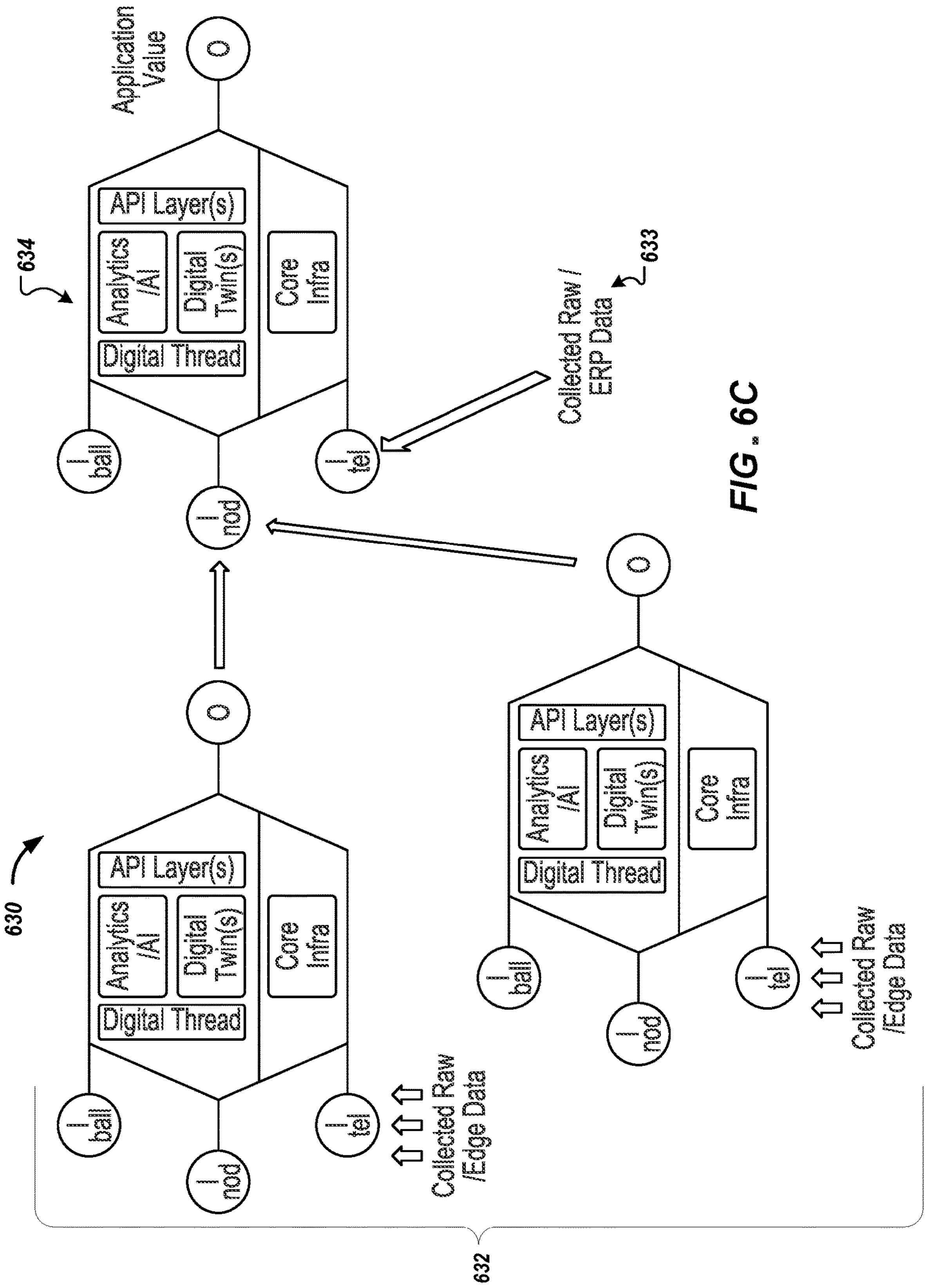

FIG. 6C shows an example provider-consumer federated nodes configuration 630. Provider-consumer federated nodes provide a directional tree structure of information flow. For example, a set of nodes 632 output data to a central node 634, which also receives raw, source, or edge data 633. Maintaining federation of value that can be both provided at each data node level in terms of direct query over data sources, as well as allowing for incremental usage extending a former value chain node. The provider-consumer federated node configuration is a combination for edge and centralized data architecture. Both types of delegated, aggregated, and direct queries can be applied on different nodes, yet the flow of aggregation is uni-directional. Examples are command-and-control situational awareness solutions such as defense and safety, fleet management for both separate vehicles as well as centralized command center, and logistics warehouse and supply chain.

A configuration of data nodes that follows a centralized federated ontology may be composed from multiple modular ontologies. A chain of data nodes can also feed another chain. The nodes can be identical in terms of the data node ontological type yet different in implementation in terms of cloud vendor native services, or elected persistency type, data nodes can act as an intermediate data and analytics engine partially delegating data to reduce storage capacity needs in the cloud, while maintaining traceability to the data origin.

Figure 6D:
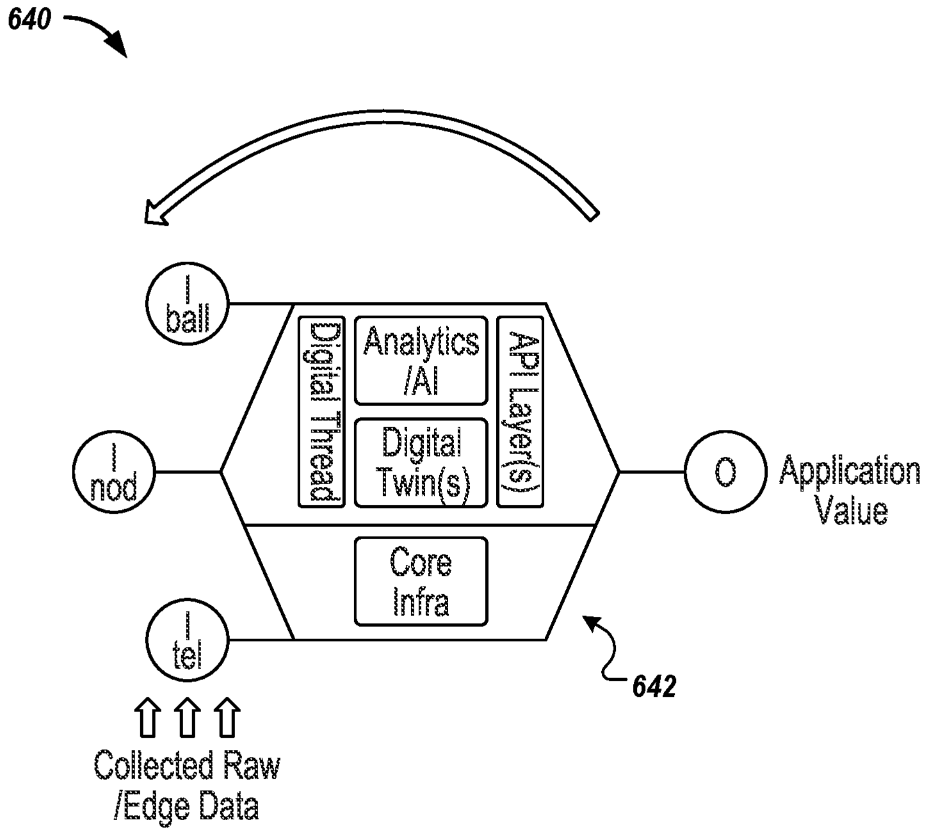

FIG. 6D shows an example recursive node configuration 640. A recursive node configuration is a combination of a Centralized Single Node with a Value Chain configuration. In a recursive node configuration, the cascading value is done on the same repository. With respect to storage, a recursive node 642 behaves like a centralized repository. With respect to behavior, the recursive node 642 behaves like a Value Chain. Such topology can be implemented for self-learning and retraining of data for AI systems and within a closed-loop control alongside a temporal memory that is improved for future analytics (e.g., retraining). Examples include Cyber Digital Twins, business risk analysis, manufacturing predictive maintenance, Oceanic and Earth digital twins, or Sustainability Digital Twins.

Figure 6E:
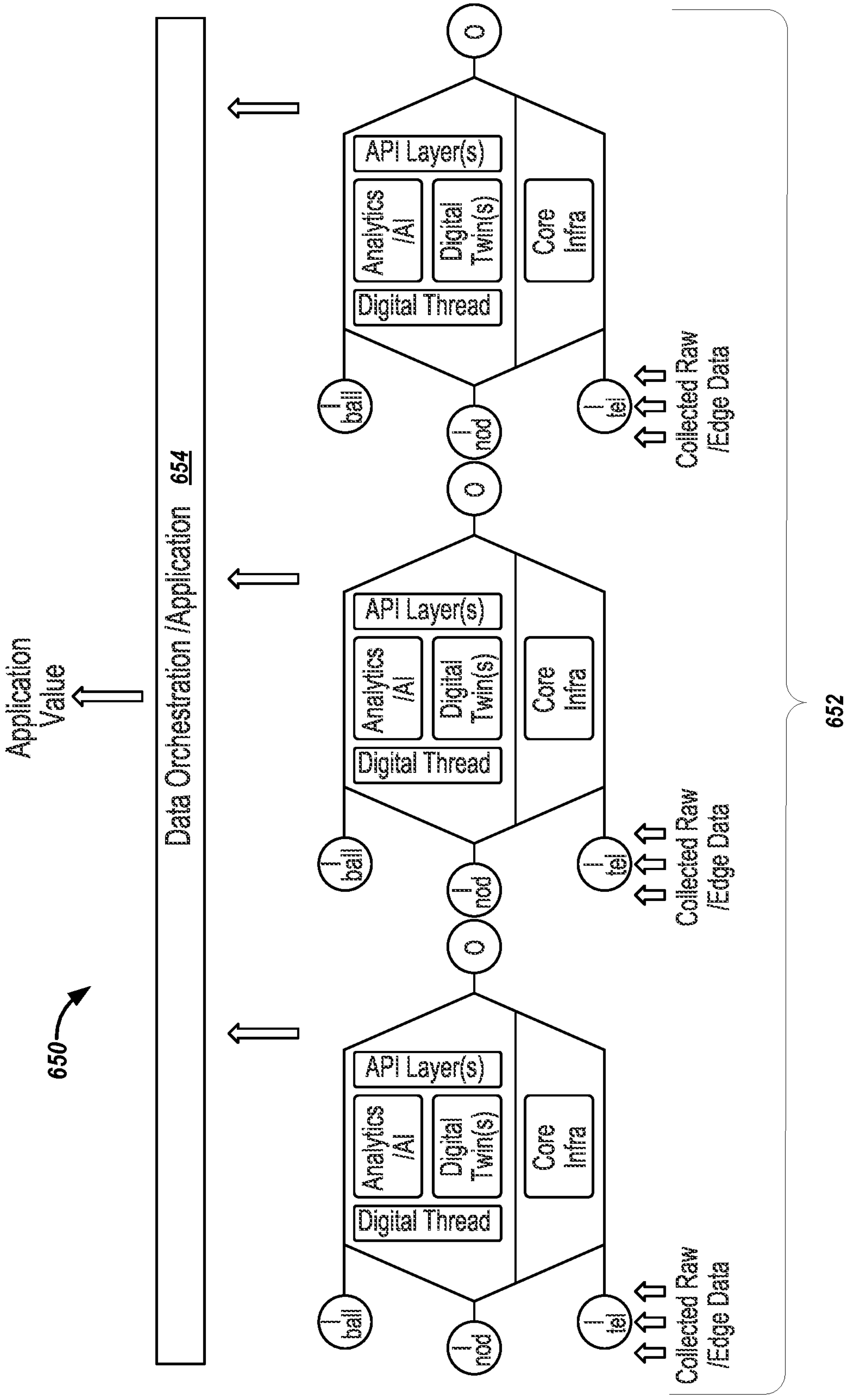

FIG. 6E shows an example data mesh/edge configuration 650. A data mesh/edge structure is a data mesh in which data mesh APIs of multiple data nodes 652 provide data to a standard data orchestration flow 654. Examples include service-oriented architecture business process management and workflow engines in enterprise resource planning systems, as well as dashboards and mash-up portals. This configuration of multiple data nodes, regardless of their locations on edge or cloud, can be wrapped around existing data sources. The data sources are responsible for normalizing and adjusting the data format to a standardized, approved data schema, yet manage their versioning of updated schema separately. A usage scenario can be forming a marketplace for comparing retail prices, bid system, IoT management system, supply chain management and more. In the AI space, a data mesh is key for federated learning, in which the ability to activate the different nodes for a retrain ask, and collection of AI features is needed for an evolving common service.

Figure 6F:
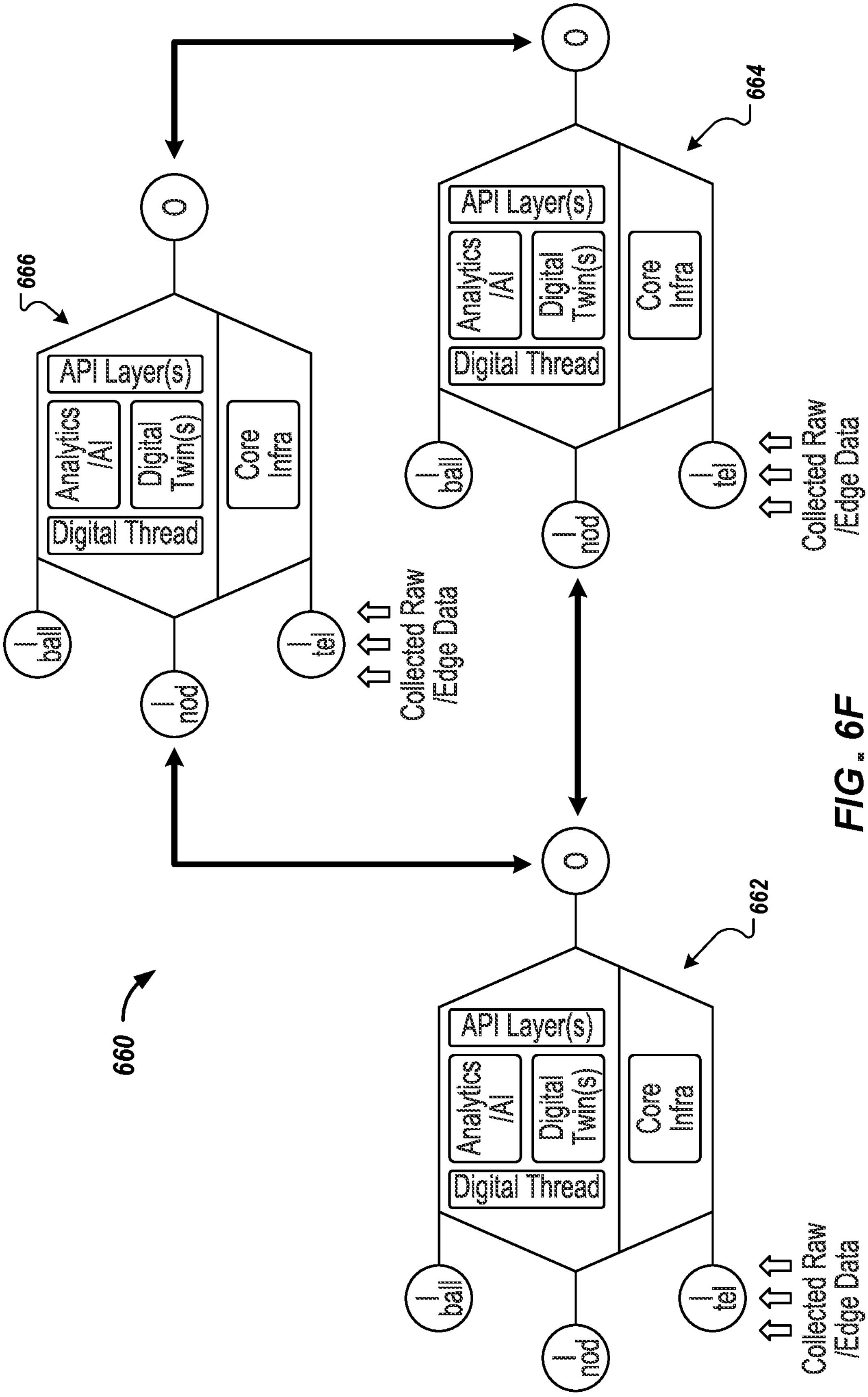

FIG. 6F shows an example peer node configuration 660. A peer node configuration, or peer-to-peer nodes topology, is an edge data architecture, in which every data source is an independent state machine. Each data node can feed other nodes and is responsible for its own execution. For example, the nodes 662, 664, 666 each provide data to the other nodes and each receive raw, source, or edge data. Examples include collaboration of autonomous objects such as drones and vehicles, smart city grid management for stitched-up view and situational awareness, and energy delivery grid management. In a peer topology, there is no unified, single-data schema, that passes data to one another, and each node interprets and harmonizes the data ingestion on its own.

Figure 7:
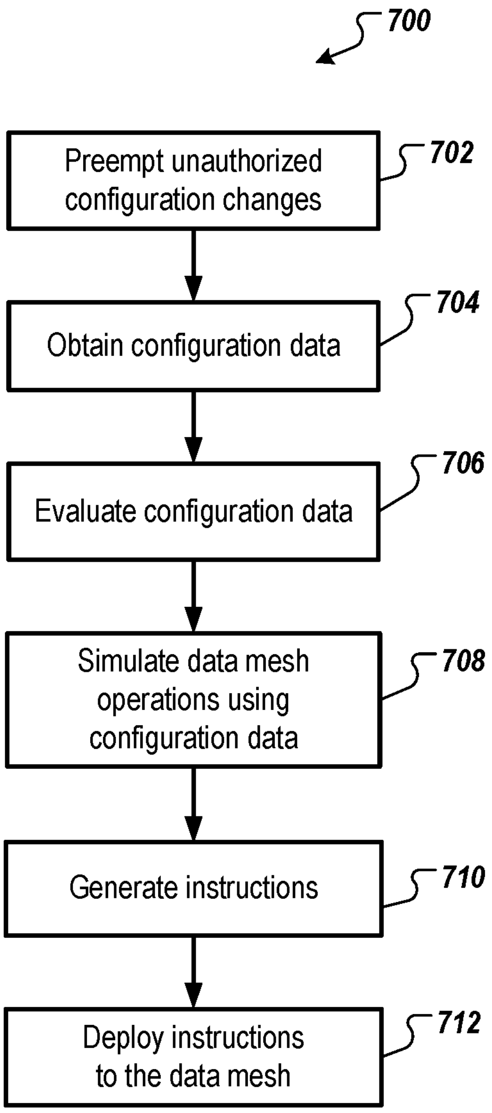
FIG. 7 is a flow diagram of an example process for configuring data nodes of an IDM.

FIG. 7 is a flow diagram of an example process 700 that can be executed in accordance with implementations of the present disclosure. In some implementations, the example process 700 may be performed using one or more computer-executable programs executed using one or more computing devices. For example, the process 700 can be performed by the ontology design system 474. The example process 700 can be performed for configuring distributed data nodes for flexible data mesh architectures in accordance with implementations of the present disclosure.

Unauthorized configuration changes are preempted (702). For example, the design system 474 may determine, based on one or more of the factors 501, that a particular node is not permitted to access a particular type of data. The design system 474 can preempt a configuration change that would connect the particular node with the particular type of data. Thus, a user will not be able to request the unauthorized connection.

Configuration data is obtained (704). The configuration data can be, for example, data indicating a change to one or more nodes of a data mesh, e.g., nodes 525. In some examples, configuration data indicates a data topology or architecture for the data mesh. In some examples, the configuration data adds or removes a node from the data mesh. In some examples, the configuration specifies a policy change to be implemented throughout the data mesh.

The configuration data is evaluated (706). For example, the design system 474 can evaluate the configuration data using the factors 501. The evaluation can include evaluating predicted impacts of the configuration data on each node of the data mesh. The evaluation can also include evaluating predicted cascading impacts of the evaluation factors. For example, configuration data that changes a data source 506 can have cascading effects on the data travel and data lineage policy 512.

Operations of the data mesh are simulated using the configuration data (708). For example, the design system 474 can simulate operations of the data mesh with the configuration data implemented. The design system 474 can obtain simulation results. The simulation results can include a simulated data flow through the data mesh. The simulation results can indicate any gaps in the data flow and/or redundancies that would be caused by implementing the configuration data.

Instructions are generated (710). For example, the design system 474 can generate the centralized instructions 510. The instructions can be generated based on the evaluation performed in step 706 of the process 700, based on the simulation results obtained in step 708 of the process 700, or both. The instructions can include instructions for data input and output to a node. The instructions can also include instructions for data analysis to be performed by a node.

The instructions are deployed (712). For example, the design system 474 can deploy the centralized instructions 510 to the data mesh. The centralized instructions 510 can be deployed in parallel. In some examples, each instruction is designated for a particular data node or group of data nodes of the data mesh. In some examples, an instruction or set of instructions can be designated for the entire data mesh. For example, the instruction or set of instructions can be designated for all nodes of the data mesh. Thus, the centralized instruction 510 can be deployed in order to manage data mesh level parameters, e.g., aggregated quality attributes of the data mesh. Deployment of the instructions causes the data nodes of the data mesh to reconfigure based on the configuration data.

In an example scenario of an implementation of a secure IDM, a unique, targeted, and just-in-time promotion that a retail shop associate can provide to a consumer while they visit the shop, such a localized promotion can provide discount for the customer favorite products to solicit an upsell of another product. The discounts are hyper-personalized to the customer, and only relevant to the inventory and goods conditions to the brick and mortar store the customer is visiting. Even more so, if the customer will be incentivized to join a loyalty club, the discounts can be improved, and the store chain will get increasing cohesiveness and relations with the customer. While the customer gains more discounts on their favorite shopping items, the customer experience manager will maximize the utilization of the shop's specific inventory and in-stock products shelf-life span. Techniques can include a potential integration between third-party marketing analytical tools, to unlock a new just-in-time, in-store upsell, using targeted and timely promotion of a product.

In an example, there is a system that is responsible for identifying a shopper's movement in the store to improve product location and layout in the store. There is a loyalty program system with a mission to maintain customers' preferences, historical purchases, commonly used products and more. In addition, there is a store inventory system that maintains status of products within the shop and their shelf-life status.

There is a desire for the store managers to encourage and generate an upsell of new products specialized for the store that depends on the inventory and its shelf-life, or any other marketing and sales needs for a specific product. The goal of the system is to form a unique and personalized promotion links a specific customer's preferred goods with the specific product to be promoted, for a limited time and subject to changing inventory conditions.

To improve customer satisfaction, the store-specific promotion should fit each specific customer, the location of the customer within the store, and the status of the related promoted products. Since different stores may have other constraints and promotion needs, and as customers' needs differ over time, unified promotions that are only based on past purchases do not fit.

An IDM can provide dynamic connectivity. The store layout can be extracted from the location and layout services and form a local digital twin on the store edge computer. An active identified customer preference can be just-in-time extracted from the loyalty system to incentivize the customer to move to another area in the store and examine and buy the related products, according to actual inventory extracted from the inventory system.

The IDM can combine the specific store digital twin with a transient and lean customer digital twin. The localized analytics can fit the store manager's needs and inventory dynamic conditions to ensure the promotion reward is indeed available. Once fulfilled, the results of the purchased goods can be fed back to the loyalty club for future analytics.

An IDM architecture contains a centralized data node for all available promotions and edge-based digital twins for the store to handle the local traffic and in-situ promotions. It would also contain a central digital twin of all customers within the loyalty program, a set of lean versions of customer digital twins for the specific situational analytics that are connected to the store's local digital twin, and a synchronization capability to ensure data fusion is correct once completed.

The data nodes can be provisioned, re-wired, and discontinued once the store is closed to save energy and ensure return on investment of the promotion system. This scalable, dynamic activation is based on changing supply-and-demand conditions and is activated only when there are relevant promotions, active customers, and real value to be achieved. In addition, the system is actively running and consumes cloud resources only when it is relevant, minimizing energy consumption and improving cost efficiency of the underlying cloud and edge services.

New distributed data models can be created per demand leveraging federated digital twins to support the data mesh. Specifically, knowledge partners create a composite ontological data model out of modular ontologies to define federated ontologies and the related data nodes data configuration instructions.

Raw, source, or edge data sources can be mapped and linked to the data nodes managed ontological sub-universe. Generic AI and analytics simulation and be defined and provided to be activated holistically on each data node, or in a Federated Learning mode across the data mesh. Reusable Ontologies and Analytics content can be detected and used to evolve the ontology library, including managing deployed ontologies across their life cycle.

Reusable data pattern and information can be integrated across domain applications for increased value, generating reusable modular ontologies, transformation rules, and data security rules. Data can be gathered from users and communities to improve ontological content for future ROI, define reusable domain analytics and expandable domain analytics. Analytics and problem space can be adjusted to a specific setting, consolidating and increasing performance and value over time.

AI models can be integrated and constructed to providing data services and construct the application offering. AI Simulation can be performed by training the AI systems and evolve over time the prediction and quality. The software used for the unique applied solution on top of the data mesh can be constructed. Graph instances and digital twins can be populated and built.

Analytics can be provided as a service, including data nodes installation and dynamic cloud native service management of the common functionality of the data mesh, cloud, and edge(s). Specifically, data mesh can be provided as a service, based on modular data nodes. Data analytics workload execution and simulations can be provided as a service.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question (e.g., code) that constitutes processor firmware, a protocol stack, a database management system, an operating system, or a combination of one or more of them. A propagated signal is an artificially generated signal (e.g., a machine-generated electrical, optical, or electromagnetic signal) that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any appropriate kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks). However, a computer need not have such devices. Moreover, a computer may be embedded in another device (e.g., a mobile telephone, a personal digital assistant (PDA), a mobile audio player, a Global Positioning System (GPS) receiver). Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD-ROM disks. The processor and the memory may be supplemented by, or incorporated in, special purpose logic circuitry.

To provide for interaction with a user, implementations may be realized on a computer having a display device (e.g., a CRT (cathode ray tube), LCD (liquid crystal display), LED (light-emitting diode) monitor, for displaying information to the user and a keyboard and a pointing device (e.g., a mouse or a trackball), by which the user may provide input to the computer. Other kinds of devices may be used to provide for interaction with a user as well; for example, feedback provided to the user may be any appropriate form of sensory feedback (e.g., visual feedback, auditory feedback, or tactile feedback); and input from the user may be received in any appropriate form, including acoustic, speech, or tactile input.

Implementations may be realized in a computing system that includes a back end component (e.g., as a data server), or that includes a middleware component (e.g., an application server), or that includes a front end component (e.g., a client computer having a graphical user interface or a Web browser through which a user may interact with an implementation), or any appropriate combination of one or more such back end, middleware, or front end components. The components of the system may be interconnected by any appropriate form or medium of digital data communication (e.g., a communication network). Examples of communication networks include a local area network ("LAN") and a wide area network ("WAN") (e.g., the Internet).

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed.

What is claimed is:

1. A computer-implemented method executed by one or more processors of a computing device in communication with a server system over a network, the method comprising:

obtaining, by the computing device over the network, first configuration data for a data mesh including a plurality of data nodes, wherein each data node of the plurality of data nodes is activated in the form of a contextual digital twin, wherein obtaining the first configuration data for the data mesh comprises determining, based on data indicating a data access policy for the data mesh, first configuration for the data mesh that complies with the data access policy, wherein the data access policy indicates, for a type of data, a subset of the plurality of data nodes that is permitted to access the type of data, wherein each data node of the plurality of data nodes is configured to receive instructions and perform operations based on the instructions, the operations including processing input data and producing output data, wherein the data mesh includes distributed computation and storage to implement and activate the plurality of data nodes on cloud and edges, with a wiring and data flow direction which is adjustable in real time, and wherein the data mesh further includes embedded data security as an integrated part of the data flow within the data mesh, wherein processing the input data comprises validating and verifying the input data based on a plurality of factors, wherein the plurality of factors comprises a domain ontology, a logical data topology, data sources, data in motion and data fusion, data travel and data lineage policy, and data authorization and security policy, wherein the domain ontology identifies the data to be managed by each data node;

simulating, by the computing device, operations of the data mesh to generate simulation results using the first configuration data;

determining, by the computing device, based on the simulation results, that the first configuration data satisfies criteria for configuring the data mesh;

generating, by the computing device, from the first configuration data and based on the simulation results, a set of instructions for the plurality of data nodes of the data mesh, wherein generating, from the first configuration data and based on the simulation results, the set of instructions for the plurality of data nodes of the data mesh comprises:

determining, based on the simulation results, a predicted impact of configuring the data mesh based on the first configuration data across the plurality of data nodes of the data mesh;

evaluating effects of the predicted impact on the plurality of nodes; and generating the instructions for the plurality of data nodes based on the predicted impact and the evaluated effects of the predicted impact on the plurality of nodes; and configuring, by the computing device, the data mesh based on the first configuration data by deploying the set of instructions to the plurality of data nodes of the data mesh, wherein the data mesh is configurable in real-time, wherein deploying the set of instructions to the plurality of data nodes of the data mesh aligns the data mesh to comply with the data access policy for the data mesh, wherein the set of instructions are deployed parallelly to the plurality of data nodes of the data mesh, wherein the data mesh has a first topology, and wherein configuring the data mesh based on the first configuration data comprises changing connections between the plurality of data nodes in the data mesh from the first topology to a second topology different from the first topology.

2. The method of claim 1, wherein the first topology and the second topology each include one or more of a group of topologies including centralized topology, edge topology, data mesh topology, peer-to-peer topology, federated topology, pipe and filter topology, and value chain topology.

3. The method of claim 1, wherein each instruction of the set of instructions is designated for a respective data node of the data mesh.

4. The method of claim 1, wherein at least one instruction of the set of instructions is designated for all data nodes of the data mesh.

5. The method of claim 1, wherein deploying the set of instructions to the plurality of data nodes of the data mesh comprises deploying a first instruction to a first data node of the plurality of data nodes.

6. The method of claim 1, comprising:

receiving data indicating a data access policy for the data mesh, wherein deploying the set of instructions to the plurality of data nodes of the data mesh aligns the data mesh to comply with the data access policy for the data mesh.

7. The method of claim 1, comprising:

wherein generating the set of instructions for the plurality of data nodes of the data mesh comprises generating, for each of the plurality of data nodes, an instruction to reconfigure the data node to align with the first configuration; and wherein deploying the set of instructions to the plurality of data nodes of the data mesh causes reconfiguration of the data mesh to the first configuration that complies with the data access policy.

8. The method of claim 1, wherein processing the input data comprises:

processing first input data received from a data node of the data mesh; and processing second input data received from a raw, source, or edge data source.

9. The method of claim 1, wherein the first configuration data indicates a change to a configuration of a first data node, the method comprising:

evaluating the first configuration data to determine a predicted impact of the change to the configuration of the first data node on a second data node; and based on the predicted impact, generating the set of instructions including generating a first instruction designated for the first data node and generating a second instruction designated for the second data node.

10. The method of claim 1, wherein:

the first configuration data indicates a first configuration of the data mesh, and deploying the set of instructions to the plurality of data nodes of the data mesh aligns the data mesh with the first configuration.

11. The method of claim 1, wherein an instruction of the set of instructions indicates, for a first data node, at least one data node for providing the input data to the first data node.

12. The method of claim 1, wherein an instruction of the set of instructions indicates, for a first data node, at least one data node for receiving the output data from the first data node.

13. The method of claim 1, wherein an instruction of the set of instructions indicates, for a first data node, a destination of the output data from the first data node.

14. The method of claim 1, wherein:

the input data includes raw, source, or edge input data, and an instruction of the set of instructions indicates, for a first data node, a data source for providing the raw, source, or edge input data to the first data node.

15. The method of claim 1, wherein each data node includes a plurality of reconfigurable modules including one or more of a data node analytics module, a digital twin module, and a core infrastructure module.

16. The method of claim 1, wherein each data node includes a reconfigurable content bundle module configured to store instructions for at least one of data model, data analysis, data transformation, or data security, wherein each data node is configured to update the stored instructions of the respective content bundle module in response to receiving an instruction of the set of instructions.

17. A non-transitory computer-readable storage medium coupled to one or more processors of a computing device in communication with a server system over a network, the non-transitory computer-readable storage medium having instructions stored thereon which, when executed by the one or more processors, cause the one or more processors of the computing device to perform operations comprising:

obtaining, by the computing device over the network, first configuration data for a data mesh including a plurality of data nodes, wherein each data node of the plurality of data nodes is activated in the form of a contextual digital twin, wherein obtaining the first configuration data for the data mesh comprises determining, based on data indicating a data access policy for the data mesh, first configuration for the data mesh that complies with the data access policy, wherein the data access policy indicates, for a type of data, a subset of the plurality of data nodes that is permitted to access the type of data, wherein each data node of the plurality of data nodes is configured to receive instructions and perform operations based on the instructions, the operations including processing input data and producing output data, wherein the data mesh includes distributed computation and storage to implement and activate the plurality of data nodes on cloud and edges, with a wiring and data flow direction which is adjustable in real time, and wherein the data mesh further includes embedded data security as an integrated part of the data flow within the data mesh, wherein processing the input data comprises validating and verifying the input data based on a plurality of factors, wherein the plurality of factors comprises a domain ontology, a logical data topology, data sources, data in motion and data fusion, data travel and data lineage policy, and data authorization and security policy, wherein the domain ontology identifies the data to be managed by each node;

simulating, by the computing device, operations of the data mesh to generate simulation results using the first configuration data;

determining, by the computing device, based on the simulation results, that the first configuration data satisfies criteria for configuring the data mesh;

generating, by the computing device, from the first configuration data and based on the simulation results, a set of instructions for the plurality of data nodes of the data mesh, wherein generating, from the first configuration data and based on the simulation results, the set of instructions for the plurality of data nodes of the data mesh comprises:

determining, based on the simulation results, a predicted impact of configuring the data mesh based on the first configuration data across the plurality of data nodes of the data mesh;

evaluating effects of the predicted impact on the plurality of nodes; and generating the instructions for the plurality of data nodes based on the predicted impact and the evaluated effects of the predicted impact on the plurality of nodes; and configuring, by the computing device, the data mesh based on the first configuration data by deploying the set of instructions to the plurality of data nodes of the data mesh, wherein the set of instructions are deployed parallelly to the plurality of data nodes of the data mesh, wherein the data mesh is configurable in real-time, wherein deploying the set of instructions to the plurality of data nodes of the data mesh aligns the data mesh to comply with the data access policy for the data mesh, wherein the data mesh has a first topology, and wherein configuring the data mesh based on the first configuration data comprises changing connections between the plurality of data nodes in the data mesh from the first topology to a second topology different from the first topology.

18. A system, comprising:

a computing device in communication with a server system over a network, wherein the server system comprises one or more processors; and a computer-readable storage device coupled to the computing device and having instructions stored thereon which, when executed by the computing device, cause the one or more processors in communication with the computing device to perform operations comprising:

obtaining, by the computing device, first configuration data for a data mesh including a plurality of data nodes, wherein each data node of the plurality of data nodes is activated in the form of a contextual digital twin, wherein obtaining the first configuration data for the data mesh comprises determining, based on data indicating a data access policy for the data mesh, first configuration for the data mesh that complies with the data access policy, wherein the data access policy indicates, for a type of data, a subset of the plurality of data nodes that is permitted to access the type of data, wherein each data node of the plurality of data nodes is configured to receive instructions and perform operations based on the instructions, the operations including processing input data and producing output data, wherein the data mesh includes distributed computation and storage to implement and activate the plurality of data nodes on cloud and edges, with a wiring and data flow direction which is adjustable in real time, and wherein the data mesh further includes embedded data security as an integrated part of the data flow within the data mesh, wherein processing the input data comprises validating and verifying the input data based on a plurality of factors, wherein the plurality of factors comprises a domain ontology, a logical data topology, data sources, data in motion and data fusion, data travel and data lineage policy, and data authorization and security policy, wherein the domain ontology identifies the data to be managed by each node;

simulating, by the computing device, operations of the data mesh to generate simulation results using the first configuration data;

determining, by the computing device, based on the simulation results, that the first configuration data satisfies criteria for configuring the data mesh;

generating, by the computing device, from the first configuration data and based on the simulation results, a set of instructions for the plurality of data nodes of the data mesh, wherein generating, from the first configuration data and based on the simulation results, the set of instructions for the plurality of data nodes of the data mesh comprises:

determining, based on the simulation results, a predicted impact of configuring the data mesh based on the first configuration data across the plurality of data nodes of the data mesh;

evaluating effects of the predicted impact on the plurality of nodes; and generating the instructions for the plurality of data nodes based on the predicted impact and the evaluated effects of the predicted impact on the plurality of nodes; and configuring by the computing device, the data mesh based on the first configuration data by deploying the set of instructions to the plurality of data nodes of the data mesh, wherein the data mesh is configurable in real-time, wherein deploying the set of instructions to the plurality of data nodes of the data mesh aligns the data mesh to comply with the data access policy for the data mesh, wherein the set of instructions are deployed parallelly to the plurality of data nodes of the data mesh, wherein the data mesh has a first topology, and wherein configuring the data mesh based on the first configuration data comprises changing connections between the plurality of data nodes in the data mesh from the first topology to a second topology different from the first topology.

* * * * *